(12) United States Patent
Zento et al.

(10) Patent No.: US 10,464,253 B2
(45) Date of Patent: Nov. 5, 2019

(54) BIAXIALLY STRETCHED FILM AND METHOD OF MANUFACTURING THE SAME, POLARIZER PROTECTIVE FILM, DECORATIVE FILM, AND LAYERED FILM

(71) Applicant: KURARAY CO., LTD., Kurashiki (JP)

(72) Inventors: Toshiyuki Zento, Tsukuba (JP); Naoto Fukuhara, Tsukuba (JP); Eiji Nakamura, Tsukuba (JP); Michiyuki Nanba, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 193 days.

(21) Appl. No.: 15/300,527

(22) PCT Filed: Mar. 26, 2015

(86) PCT No.: PCT/JP2015/001714
§ 371 (c)(1),
(2) Date: Sep. 29, 2016

(87) PCT Pub. No.: WO2015/151466
PCT Pub. Date: Oct. 8, 2015

(65) Prior Publication Data
US 2017/0173850 A1 Jun. 22, 2017

(30) Foreign Application Priority Data

Mar. 31, 2014 (JP) .................................. 2014-072827

(51) Int. Cl.
*B29C 55/16* (2006.01)
*B32B 27/30* (2006.01)
(Continued)

(52) U.S. Cl.
CPC ............ *B29C 55/16* (2013.01); *B29C 55/005* (2013.01); *B29C 55/023* (2013.01); *B29C 55/12* (2013.01);
(Continued)

(58) Field of Classification Search
CPC ........ B29C 55/12–165; B29K 2033/12; B29K 2003/08–12; B32B 27/308
See application file for complete search history.

(56) References Cited

U.S. PATENT DOCUMENTS

2011/0236635 A1 9/2011 Shimizu et al.
2011/0269910 A1 11/2011 Chun et al.
(Continued)

FOREIGN PATENT DOCUMENTS

CN 102990916 A 3/2013
EP 2 354 179 A1 8/2011
(Continued)

OTHER PUBLICATIONS

Machine Translation of JP2009-292869A. Dec. 17, 2009 (Year: 2009).*
(Continued)

*Primary Examiner* — Stephen E Rieth
(74) *Attorney, Agent, or Firm* — Oblon, McClelland, Maier & Neustadt, L.L.P.

(57) ABSTRACT

A method of manufacturing a biaxially stretched film according by: (I) preheating a thermoplastic resin film to a temperature in a rubbery plateau region in a storage elastic modulus curve; (II) biaxially stretching the thermoplastic resin film under a condition that a stretching speed is 500%/min or higher while heating the thermoplastic resin film to the temperature in the rubbery plateau region; (III) cooling the thermoplastic resin film after the biaxially stretching (II) to a temperature in a glass-to-rubber transition
(Continued)

region or a glass region in the storage elastic modulus curve; and (IV) relaxing the thermoplastic resin film after the cooling (III) at a temperature in the glass-to-rubber transition region.

8 Claims, 2 Drawing Sheets

(51) Int. Cl.
| | |
|---|---|
| B29C 55/12 | (2006.01) |
| C08J 5/18 | (2006.01) |
| B29C 55/00 | (2006.01) |
| B29C 55/02 | (2006.01) |
| G02B 5/30 | (2006.01) |
| G02B 1/14 | (2015.01) |
| B32B 27/08 | (2006.01) |
| B32B 27/36 | (2006.01) |
| B44C 3/02 | (2006.01) |
| B29K 33/00 | (2006.01) |
| B29K 69/00 | (2006.01) |
| B29K 425/00 | (2006.01) |

(52) U.S. Cl.
CPC ............ B29C 55/165 (2013.01); B32B 27/08 (2013.01); B32B 27/30 (2013.01); B32B 27/365 (2013.01); B44C 3/02 (2013.01); C08J 5/18 (2013.01); G02B 1/14 (2015.01); G02B 5/3033 (2013.01); B29K 2033/08 (2013.01); B29K 2069/00 (2013.01); B29K 2425/00 (2013.01); B32B 2250/24 (2013.01); C08J 2333/12 (2013.01); C08J 2469/00 (2013.01)

(56) References Cited

U.S. PATENT DOCUMENTS

| | | | | |
|---|---|---|---|---|
| 2013/0281603 | A1* | 10/2013 | Jin | C08L 51/003 524/504 |
| 2014/0329078 | A1* | 11/2014 | Miyaguchi | C08K 5/20 428/316.6 |
| 2015/0064485 | A1 | 3/2015 | Shimizu et al. | |

FOREIGN PATENT DOCUMENTS

| | | | |
|---|---|---|---|
| GB | 1 490 512 A | 11/1977 | |
| JP | 2009-292869 A | 12/2009 | |
| JP | 2009292869 A * | 12/2009 | |
| JP | 2013-148655 A | 8/2013 | |
| WO | 2010/079920 A2 | 7/2010 | |
| WO | WO-2013084845 A1 * | 6/2013 | ............ B29C 55/14 |

OTHER PUBLICATIONS

Zhao et al. Synthesis and characterization of multi-walled carbon nanotubes reinforced polyamide 6 via in situ polymerization. Polymer, 2005, 46, 5125-5132. (Year: 2005).*

International Search Report dated Jun. 30, 2015 in PCT/JP2015/001714 filed Mar. 26, 2015.

Extended European Search Report dated Oct. 9, 2017 in Patent Application No. 15772473.3.

Office Action dated Aug. 6, 2018 in Taiwanese Patent Application No. 104110171, 15 pages, (with English translation).

* cited by examiner

BIAXIALLY STRETCHED FILM AND METHOD OF MANUFACTURING THE SAME, POLARIZER PROTECTIVE FILM, DECORATIVE FILM, AND LAYERED FILM

TECHNICAL FIELD

The present invention relates to a biaxially stretched film and a method of manufacturing the same.

The present invention further relates to a polarizer protective film, a decorative film, and a layered film that use the biaxially stretched film.

BACKGROUND ART

Various resin films such as a polarizer protective film are used for a liquid crystal display device.

In related art, a triacetyl cellulose (TAC) film has been mainly used for the polarizer protective film. However, the TAC film exhibits large moisture permeability and when the TAC film is, in particular, a thin film, it may cause a reduction in the quality of polarizers.

The use of a non-crystalline thermoplastic resin film including a (meth)acrylic resin, a cyclic olefin resin, or a maleimide resin as a main component has been discussed as a new polarizer protective film instead of the TAC film.

For example, an optical film in which resin such as a carbonate resin is added to a (meth)acrylic resin including a copolymer of an alkyl (meth)acrylate monomer and an aromatic vinyl monomer and/or an imide-based monomer is disclosed (e.g., Claim 10 of Patent Literature 1 and Claim 1 of Patent Literature 2). This Patent Literature discloses that the optical film can be preferably used for a polarizer protective film or the like.

The aforementioned non-crystalline thermoplastic resin film tends to exhibit brittleness and reduced mechanical properties when the thickness of the film is reduced. One known process for increasing the toughness of the non-crystalline thermoplastic resin film is a stretching process.

Patent Literature 1 and 2 propose biaxially stretching a thermoplastic resin film at or around a glass transition temperature Tg of the material, more specifically, at a temperature of (Tg−20° C.) to (Tg+30° C.) (paragraph 0046 of Patent Literature 1 and paragraph 0040 of Patent Literature 2).

CITATION LIST

Patent Literature

[Patent Literature 1] International Patent Publication No. WO 2010/079920
[Patent Literature 2] Japanese Unexamined Patent Application Publication No. 2013-148655

SUMMARY OF INVENTION

Technical Problem

When the aforementioned non-crystalline thermoplastic resin film is subjected to the stretching process, residual stress during the process may cause a change in the dimension of the film due to heat shrinkage.

The change in the dimension of the film due to the heat shrinkage may cause winding wrinkles, winding deviation, winding squeeze or the like when the biaxially stretched film is wound up.

Further, when the biaxially stretched film and another resin film are layered with each other, the film may warp or curl.

Further, when the biaxially stretched film and a non-resin material such as metal or wood are bonded together, the film may be peeled off due to a temperature change.

Further, when the biaxially stretched film is used for a polarizer protective film, the dimensional change due to the heat shrinkage of the biaxially stretched film may affect a display quality of the liquid crystal display device in an environment in which the biaxially stretched film is used (under, in particular, a high temperature).

The present invention has been made in view of the aforementioned circumstances and aims to provide a biaxially stretched film composed of a thermoplastic resin which exhibits small heat shrinkage and has excellent dimensional stability and a method of manufacturing the same.

Solution to Problem

A method of manufacturing a biaxially stretched film according to the present invention is a method of manufacturing a biaxially stretched film in which an unstretched thermoplastic resin film composed of at least one thermoplastic resin layer is biaxially stretched in a longitudinal direction and a width direction to manufacture the biaxially stretched film, the method including:

a process (I) for preheating the thermoplastic resin film to a temperature in a rubbery plateau region in a storage elastic modulus curve;

a process (II) for biaxially stretching the thermoplastic resin film under a condition that a stretching speed is 500%/min or higher while heating the thermoplastic resin film to the temperature in the rubbery plateau region;

a process (III) for cooling the thermoplastic resin film after the process (II) to a temperature in a glass-to-rubber transition region or a glass region in the storage elastic modulus curve; and a process (IV) for relaxing the thermoplastic resin film after the process (III) under the temperature in the glass-to-rubber transition region.

The storage elastic modulus curve is a curve indicating a relation between a temperature obtained by a dynamic mechanical thermal analysis method (DMTA method) and the storage elastic modulus (DMTA curve).

In this specification, unless otherwise specified, the storage elastic modulus curve is measured at a frequency of 1 Hz and a heating speed of 3° C./min.

FIG. 1 shows one example of the storage elastic modulus curve.

In the storage elastic modulus curve, a temperature region up to the glass transition temperature Tg is called a glass region. In this region, the storage elastic modulus gradually decreases as the temperature increases.

There is a temperature region in which the storage elastic modulus is greatly reduced as the temperature increases when the temperature exceeds the glass transition temperature Tg. This temperature region is called a glass-to-rubber transition region.

There is a temperature region in which the storage elastic modulus is not greatly changed even when the temperature increases. This temperature region is called a rubbery plateau region. In the rubbery plateau region, although molecular chains of a polymer move, the polymer does not completely melt.

There is a temperature region in which the storage elastic modulus is greatly reduced as the temperature increases. This temperature region is called a flow region.

As shown in FIG. 1, each of the regions in the storage elastic modulus curve is obtained as follows.

A point A in which the inclination becomes the largest in the negative side at around the glass transition temperature Tg in the storage elastic modulus curve (point in which a differential coefficient becomes the smallest) is obtained. In this point A, a straight line tangent to the storage elastic modulus curve is drawn (tangent line 2).

Next, in a point B in which the temperature is lower than that in the point A by 50° C., the differential coefficient is obtained and a straight line tangent to the storage elastic modulus curve is drawn (tangent line 1). Further, in a point C in which the temperature is higher than that in the point A by 30° C., the differential coefficient is obtained and a straight line tangent to the storage elastic modulus curve is drawn (tangent line 3).

An intersection D of the tangent line 1 with the tangent line 2 and an intersection E of the tangent line 2 with the tangent line 3 are obtained.

A region in which the temperature is lower than that in the point D is called the glass region.

A temperature region from the point D to the point E is called the glass-to-rubber transition region.

A region in which the temperature is higher than that in the point E and the value of the inclination of the storage elastic modulus curve substantially coincides with the tangent line 3 is called the rubbery plateau region.

A region next to the rubbery plateau region in which the storage elastic modulus curve is suddenly decreased in a high temperature side is called the flow region.

It is difficult to obtain the accurate temperature of the boundary between the rubbery plateau region and the flow region (the upper limit temperature in the rubbery plateau region).

In the flow region, the shape of the film cannot be maintained and the stretching cannot be performed. Accordingly, in a range in which the stretching can be performed, it is assumed that a temperature equal to or higher than the lower limit temperature in the rubbery plateau region is a temperature in the rubbery plateau region.

The biaxially stretched film according to the present invention is manufactured by the method of manufacturing the aforementioned biaxially stretched film according to the present invention.

According to the present invention, a test piece with a length of 20 mm, a width of 5 mm, and a desired thickness is cut out of the biaxially stretched film, both of the end parts of the test piece in the longitudinal direction are held by a pair of film chucks, the distance between the pair of film chucks being 10 mm and the pulling load of the biaxially stretched film being 2 g, and the test piece is attached to a thermomechanical analyzer (TMA), when the length of the test piece L85 (mm) after the test piece is heated from 25° C. to 85° C. at a heating speed of 2° C./min and the temperature of the test piece is held at 85° C. for 30 minutes and when the length of the test piece L45 (mm) after the test piece is heated from 25° C. to 45° C. at a heating speed of 2° C./min are measured, the biaxially stretched film in which the deformation rate (%) expressed by the following Expression (1) is 0 to 0.5% can be provided.

$$\text{Deformation rate (\%)} = \Delta L \text{ (mm)}/10 \text{ (mm)} \times 100 \quad (1)$$

(wherein $\Delta L$ (mm)=L85 (mm)−L45 (mm).)

The polarizer protective film according to the present invention includes the biaxially stretched film according to the present invention described above.

The decorative film according to the present invention includes the biaxially stretched film according to the present invention described above.

The layered film according to the present invention includes the biaxially stretched film according to the present invention described above.

Advantageous Effects of Invention

According to the present invention, it is possible to provide a biaxially stretched film composed of a thermoplastic resin which exhibits small heat shrinkage and has excellent dimensional stability and a method of manufacturing the same.

DESCRIPTION OF EMBODIMENTS

"Method of Manufacturing Biaxially Stretched Film"

Figure 1:
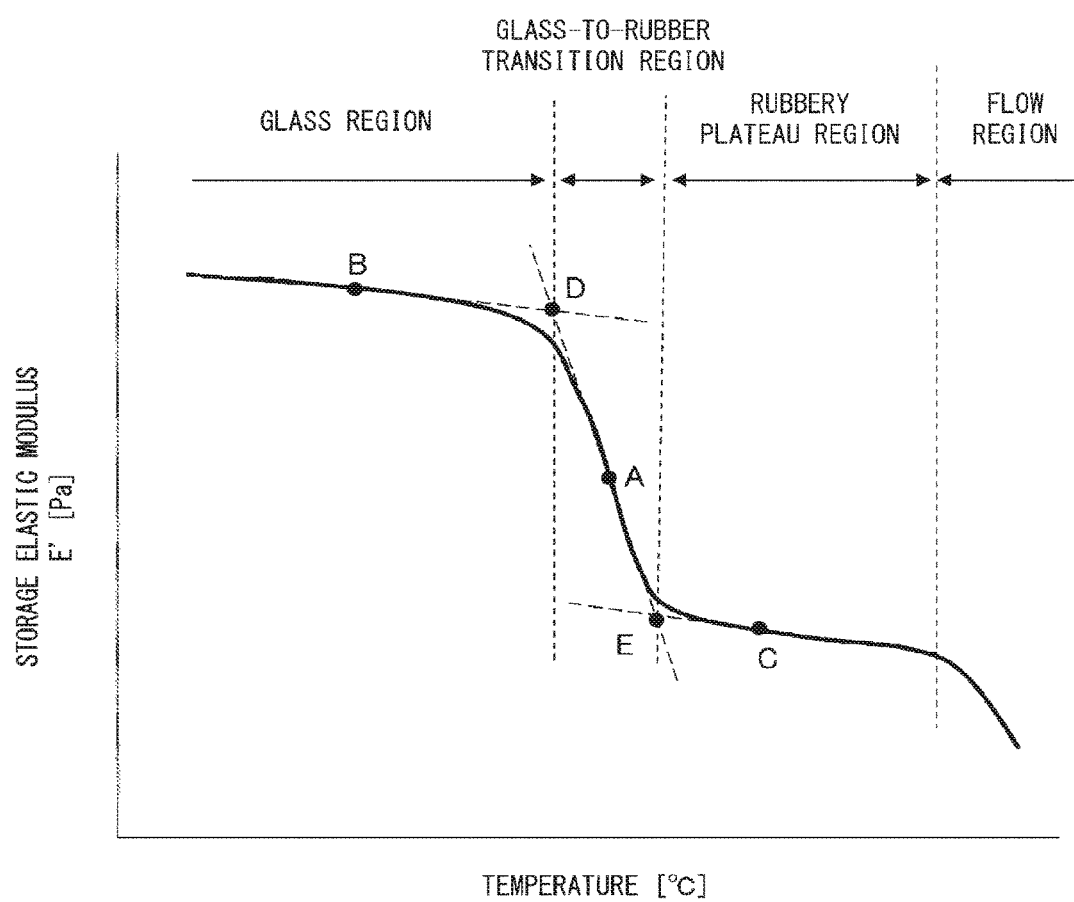
FIG. 1 is a graph showing one example of a storage elastic modulus curve.

A method of manufacturing a biaxially stretched film according to the present invention relates to a method of biaxially stretching an unstretched thermoplastic resin film composed of at least one thermoplastic resin layer (hereinafter this film will also be called an "original film before stretching") in the longitudinal direction and the width direction to manufacture a biaxially stretched film.

The method of manufacturing the unstretched thermoplastic resin film (original film before stretching) is not particularly limited and may preferably be extrusion molding, for example, for film-forming a thermoplastic resin that has been melt-kneaded using an extruder or the like.

The forming of the unstretched thermoplastic resin film (original film before stretching) and the biaxial stretching may be conducted either continuously or discontinuously.

The thickness of the unstretched thermoplastic resin film (original film before stretching) is not particularly limited and is preferably, for example, 0.02 mm to 0.5 mm.

The method of manufacturing the biaxially stretched film according to the present invention includes the following sequential processes:

a process (I) for pre-heating an unstretched thermoplastic resin film (original film before stretching) (pre-heating process);

a process (II) for biaxially stretching the thermoplastic resin film while heating the film (stretching process);

a process (III) for cooling the thermoplastic resin film after it is biaxially stretched (cooling process); and a process (IV) for relaxing the thermoplastic resin film after it is biaxially stretched.

(Processes (I) and (II))

In the process (I), the unstretched thermoplastic resin film (original film before stretching) is pre-heated to a temperature in the rubbery plateau region in the storage elastic modulus curve.

In the process (II), the thermoplastic resin film that has been pre-heated is biaxially stretched while heating the film to a temperature in the rubbery plateau region.

By carrying out the biaxial stretching, it is possible to improve the toughness of the film and to improve the handling property of the film due to the improved toughness.

Considering the easiness of conducting the process, the preheating temperature in the process (I) is preferably made equal to the stretching temperature in the process (II).

During the process (II), the stretching temperature is preferably made constant.

By stretching the thermoplastic resin film while heating it to a substantially constant temperature, the temperature of the whole thermoplastic resin film can be maintained at a desired temperature. It is therefore possible to prevent a situation in which the temperature of the thermoplastic resin film becomes lower than a preferable range and thus the stretching cannot be performed or the uniformity of thickness is decreased due to a generation of temperature distributions in the thermoplastic resin film.

Considering the manufacturing cost, the stretching speed is preferably made high.

In the process (II), both the stretching speed in the longitudinal direction and the stretching speed in the width direction are set to 500%/min or higher.

The upper limit of the stretching speed is not particularly limited. When the stretching speed is too high, however, the heat shrinkage of the biaxially stretched film to be manufactured may become large.

The stretching speed is preferably 500 to 3000%/min and more preferably 1,000 to 3000%/min.

As stated above, in the present invention, the stretching temperature in the process (II) is set to a temperature in the rubbery plateau region.

When the film is stretched at a temperature in the glass-to-rubber transition region which is lower than the temperature in the rubbery plateau region, it is difficult to stretch the film at a stretching speed of 500%/min or higher. The film tends to be broken during high-speed stretching and the productivity becomes low. Further, a biaxially stretched film which exhibits large heat shrinkage and has poor dimensional stability tends to be manufactured (see Comparative Example 2 described later).

On the other hand, when the film is stretched at a temperature in the flow region, which is in the high temperature side compared to the temperature in the rubbery plateau region, the film is melted, cannot maintain its shape, and cannot be stretched.

By setting the stretching temperature to a temperature in the rubbery plateau region, the biaxial stretching can be performed without film breakage even at a stretching speed of 500%/min or higher. Further, it is possible to manufacture a biaxially stretched film which exhibits small heat shrinkage and has excellent dimensional stability.

The biaxial stretching in the process (II) may either be a simultaneous biaxial stretching in which the film is stretched simultaneously in the longitudinal direction and the width direction or a sequential biaxial stretching in which the film is stretched in the longitudinal direction and the width direction sequentially (it does not matter whether the film is stretched in the longitudinal direction first or in the width direction first).

A tenter is typically used as the simultaneous biaxial stretching apparatus.

In this apparatus, both of the end parts of the film in the width direction are held by a pair of tenter clamps and the film is stretched in the longitudinal direction and the width direction at the same time.

Each of the tenter clamps includes a pantograph that can extract and retract and runs along one of the end parts of the film in the width direction and a plurality of clips that are provided in the pantograph and hold one of the end parts of the film.

In each of the tenter clamps, by increasing the distance between two adjacent clips, the film is stretched in the longitudinal direction (film travelling direction, Machine Direction (MD)).

By increasing the distance between the pair of tenter clamps, the film is stretched in the width direction (direction vertical to the film travelling direction, Transverse Direction (TD)).

The distance between the pair of tenter clamps is adjusted by the distance between the pair of rails on which they run.

When the film having a length LB (mm) and a width WB (mm) is stretched for T (min) to obtain the biaxially stretched film having a length LA (mm) and a width WA (mm), the stretching speed in the longitudinal direction (%/min) is expressed by the expression: (LA−LB)/LB/T×100 and the stretching speed in the width direction (%/min) is expressed by the expression: (WA−WB)/WB/T×100.

When the tenter is used, the stretching speed in the longitudinal direction and the stretching speed in the width direction are expressed by the following Expressions.

[Stretching speed in the longitudinal direction (%/min)]=([distance between two clips adjacent to each other after the stretching (mm)]−[distance between two clips adjacent to each other before the stretching (mm)])/[distance between two clips adjacent to each other before the stretching (mm)]/[time required for the stretching (min)]×100.

[Stretching speed in the width direction (%/min)]= ([distance between the pair of tenter clamps after the stretching]−[distance between the pair of tenter clamps before the stretching])/[distance between the pair of tenter clamps before the stretching]/[time required for the stretching (min)]×100

In the sequential biaxial stretching, the film stretching in the longitudinal direction and the film stretching in the width direction are carried out separately and sequentially.

The film can be stretched in the longitudinal direction using, for example, a conveyance speed difference between a pair of conveying rolls.

In this case, the stretching speed in the longitudinal direction is expressed by the following Expression.

[Stretching speed in the longitudinal direction (%/min)]=([rolling speed of a winding-side roll (m/min)]−[rolling speed of a feed-side roll (m/min)])/[rolling speed of the feed-side roll (m/min)]/[passing period between the pair of rolls (min)]×100

A tenter is typically used to stretch the film in the width direction. The stretching method and the stretching speed in the width direction of the film using the tenter are similar to those when the simultaneous biaxial stretching is performed.

In the present invention, in both the simultaneous biaxial stretching and the sequential biaxial stretching, both the stretching speed in the longitudinal direction and the stretching speed in the width direction are set to 500%/min or higher, preferably 500 to 3000%/min, and more preferably 1,000 to 3000%/min.

(Processes (III) and (IV))

In process (III), the thermoplastic resin film that has been biaxially stretched is cooled to the temperature in the glass-to-rubber transition region or the temperature in the glass region in the storage elastic modulus curve.

In the process (III), the thermoplastic resin film that has been biaxially stretched is preferably cooled to the temperature in the glass-to-rubber transition region in the storage elastic modulus curve.

In the process (III), the film temperature is adjusted to or near the relaxation temperature in the process (IV).

In the process (III), not only that the film temperature is adjusted to or near the relaxation temperature of the process (IV), an effect of reducing a bowing phenomenon can also be obtained. The "bowing phenomenon" means a convex bowing phenomenon in which a deformation of the central part of the film in the width direction precedes a deformation of both of the end parts of the film in the width direction or a concave bowing phenomenon in which a deformation of the central part of the film in the width direction is delayed compared to a deformation of both of the end parts of the film in the width direction.

Considering the easiness of conducting the process, the cooling temperature of the process (III) is preferably made equal to the relaxation temperature of the process (IV).

In the process (IV), the thermoplastic resin film that has been biaxially stretched is relaxed at a temperature in the glass-to-rubber transition region.

The relaxation rate in the longitudinal direction (%) can be expressed by the following Expression.

[Relaxation rate in the longitudinal direction (%)]=
([length of the film before the relaxation (cm)]−
[length of the film after the relaxation (cm)])/
[length of the film after the relaxation (cm)]×
100

In a similar way, the relaxation rate (%) in the width direction can be expressed by the following Expression.

[Relaxation rate in the width direction (%)]=([width of the film before the relaxation (cm)]−[width of the film after the relaxation (cm)])/[width of the film after the relaxation (cm)]×100

The relaxation speed in the longitudinal direction can be expressed by the following Expression.

[Relaxation speed in the longitudinal direction (%/min)]=([length of the film before the relaxation (cm)]−[length of the film after the relaxation (cm)])/[length of the film before the stretching (cm)]/[time required for the relaxation (min)]×100

In a similar way, the relaxation speed in the width direction can be expressed by the following Expression.

[Relaxation speed (%/min)]=([width of the film before the relaxation (cm)]−[width of the film after the relaxation (cm)])/[width of the film before the stretching (cm)]/[time required for the relaxation (min)]×100

In the present invention, the relaxation temperature in the process (IV) is set to be fallen within the temperature range of the glass-to-rubber transition region of the storage elastic modulus curve.

The present inventors have found that the biaxially stretched film which exhibits small heat shrinkage and has excellent dimensional stability can be obtained by executing the relaxation process and making the relaxation temperature in this process fall within the temperature range of the glass-to-rubber transition region.

Without the relaxation process, the heat shrinkage of the biaxially stretched film that is finally produced is increased. In this case, it is impossible to obtain a biaxially stretched film having a desired dimensional stability (see Comparative Example 1 described later).

Even when the relaxation process is performed, if the relaxation temperature is set to a temperature higher than that in the glass-to-rubber transition region (that is, a temperature in the rubbery plateau region) or to a temperature lower than that in the glass-to-rubber transition region (that is, a temperature in the glass region), the biaxially stretched film tends to exhibit large heat shrinkage and have poor dimensional stability (see Comparative Examples 3 and 4 described later).

Furthermore, when the relaxation temperature is set to a temperature lower than that in the glass-to-rubber transition region (that is, a temperature in the glass region), wrinkles tend to occur in both of the end parts of the resultant biaxially stretched film in the width direction (see Comparative Example 4 described later). Although the wrinkles occurring in both of the end parts do not cause any quality problem since both of the end parts of the biaxially stretched film in the width direction can be removed in a trimming process, the occurrence of the wrinkles is undesirable since it causes a decrease in the yield.

The heat shrinkage of the biaxially stretched film that is finally produced can be evaluated from the amount of dimensional change when the biaxially stretched film that has been produced is heated at 85° C. for 30 minutes.

Both the relaxation rate in the longitudinal direction and the relaxation rate in the width direction in the process (IV) are preferably 5 to 10% with respect to the thermoplastic resin film after the execution of the process (III).

When the relaxation rate is smaller than 5%, the heat shrinkage when the biaxially stretched film is heated at 85° C. for 30 minutes tends to increase.

On the other hand, when the relaxation rate exceeds 10%, wrinkles may occur in both of the end parts of the biaxially stretched film in the width direction. Although the wrinkles occurring in both of the end parts do not cause any quality problem since both of the end parts of the biaxially stretched film in the width direction can be removed in the trimming process, the occurrence of the wrinkles is undesirable since it causes a decrease in the yield.

While the relaxation is preferably performed in both the longitudinal direction and the width direction, it may be sufficient that the heat shrinkage be reduced for only one of the longitudinal direction and the width direction in some applications. In this case, the relaxation may be performed for only one of the directions in which it is required to reduce the heat shrinkage.

In Patent Literature 1 and 2 described in "Background Art", the relaxation process is not performed.

One method to reduce the heat shrinkage of the biaxially stretched film without executing the relaxation process includes, for example, a method of performing the heat treatment at or near the stretching temperature (e.g., about 150° C.) after the stretching process. In this case, after the heat treatment is performed, the film is preferably gradually cooled to a temperature around the glass transition temperature at a cooling speed of about 20° C./min.

When the aforementioned heating treatment is further performed after the stretching process, the toughness of the film tends to decrease (when the film is, in particular, thin), wrinkles tend to be generated in the film in the heat treatment process, and the yield tends to be decreased.

Further, when the heat treatment is successively performed using the same apparatus after the stretching process at or near the stretching temperature (e.g., about 150° C.) and the film is further cooled down gradually to or about the glass transition temperature, the length of the stretching apparatus needs to be increased, which is not preferable due to equipment limitations and high cost.

When the biaxially stretched film obtained after the stretching process is once wound up and the heat treatment is performed at or near the stretching temperature (e.g., about 150° C.), the successive manufacturing cannot be performed and the productivity becomes low although there is no need to increase the length of the stretching apparatus.

The final stretching magnification in the longitudinal direction after the execution of the processes (II) to (IV) can be expressed by the following Expression.

[Final stretching magnification in the longitudinal direction]=[length of the film after the process (IV)]/[length of the film before the process (II)]

In a similar way, the final stretching magnification in the width direction after the execution of the processes (II) to (IV) can be expressed by the following Expression.

[Final stretching magnification in the width direction]=[width of the film after the process (IV)]/[width of the film before the process (II)]

Both the final stretching magnification in the longitudinal direction and the final stretching magnification in the width direction are preferably 1.5 to 3 times.

If the final stretching magnification is smaller than 1.5 times, the effects of the stretching process, that is, the effects of improving the toughness of the film and the handling property due to the improved toughness, may not be sufficiently obtained.

If both the final stretching magnification in the longitudinal direction and the final stretching magnification in the width direction are greater than 3 times, the film tends to be broken in the stretching process.

If both the final stretching magnification in the longitudinal direction and the final stretching magnification in the width direction are 1.5 to 3 times, the effects of the stretching process, that is, the effects of improving the toughness of the film and the handling property due to the improved toughness can be stably obtained and the breakage of the film in the stretching process is also suppressed.

In the present invention, the temperature adjustment method in the respective processes (processes (I) to (IV)) is not particularly limited and a method of using hot air whose temperature is adjusted to the temperature in each process or the like is preferably used.

(Following Processes)

After the execution of the process (IV), a process (V) in which the biaxially stretched film is cooled to the room temperature is executed.

After that, a process (VI) in which both of the end parts of the biaxially stretched film in the width direction are removed (trimming process) is executed as necessary.

Last, a process (VII) for winding up the biaxially stretched film onto a wind-up roll is executed.

The biaxially stretched film is thus manufactured.

In the present invention, the processes (processes (I) to (VII)) may be performed either continuously or discontinuously.

"Biaxially Stretched Film"

The biaxially stretched film according to the present invention is manufactured by the biaxially stretched film according to the present invention described above.

The thickness of the biaxially stretched film according to the present invention is not particularly limited and is preferably from 0.005 to 0.125 mm.

According to the present invention, it is possible to provide a biaxially stretched film which has an improved toughness, exhibits small heat shrinkage, and has excellent dimensional stability.

According to the present invention, a test piece with a length of 20 mm, a width of 5 mm, and a desired thickness is cut out of the biaxially stretched film, both of the end parts of the test piece in the longitudinal direction are held by a pair of film chucks, the distance between the pair of film chucks being 10 mm and the pulling load of the biaxially stretched film being 2 g, and the test piece is attached to a thermomechanical analyzer (TMA), when the length of the test piece L85 (mm) after the test piece is heated from 25° C. to 85° C. at a heating speed of 2° C./min and the temperature of the test piece is held at 85° C. for 30 minutes and when the length of the test piece L45 (mm) after the test piece is heated from 25° C. to 45° C. at a heating speed of 2° C./min are measured, the biaxially stretched film in which the deformation rate (%) expressed by the following Expression (1) is 0 to 0.5% can be provided.

Considering the expansion due to a temperature change, the deformation rate is preferably a positive value, more preferably 0.1 to 0.4%, and particularly preferably 0.15 to 0.35%.

When the deformation rate is a negative value, the shrinkage becomes large and when the deformation rate exceeds 0.5%, the expansion becomes large. In this case, the following disadvantages may occur.

When the biaxially stretched film is wound up, defects such as winding wrinkles, winding deviation, winding squeeze or the like may occur.

When the biaxially stretched film and another resin film are layered with each other, the film may warp or curl.

When the biaxially stretched film and a non-resin material such as metal or wood are bonded together, the film may be peeled off due to a temperature change.

When the biaxially stretched film is used for a polarizer protective film, the dimensional change due to the heat shrinkage of the biaxially stretched film may affect a display quality of the liquid crystal display device in an environment in which the biaxially stretched film is used (under a high temperature, in particular).

$$\text{Deformation rate (\%)} = \Delta L \text{ (mm)}/10 \text{ (mm)} \times 100 \quad (1)$$

(wherein ΔL (mm)=L85 (mm)−L45 (mm))

Figure 2:
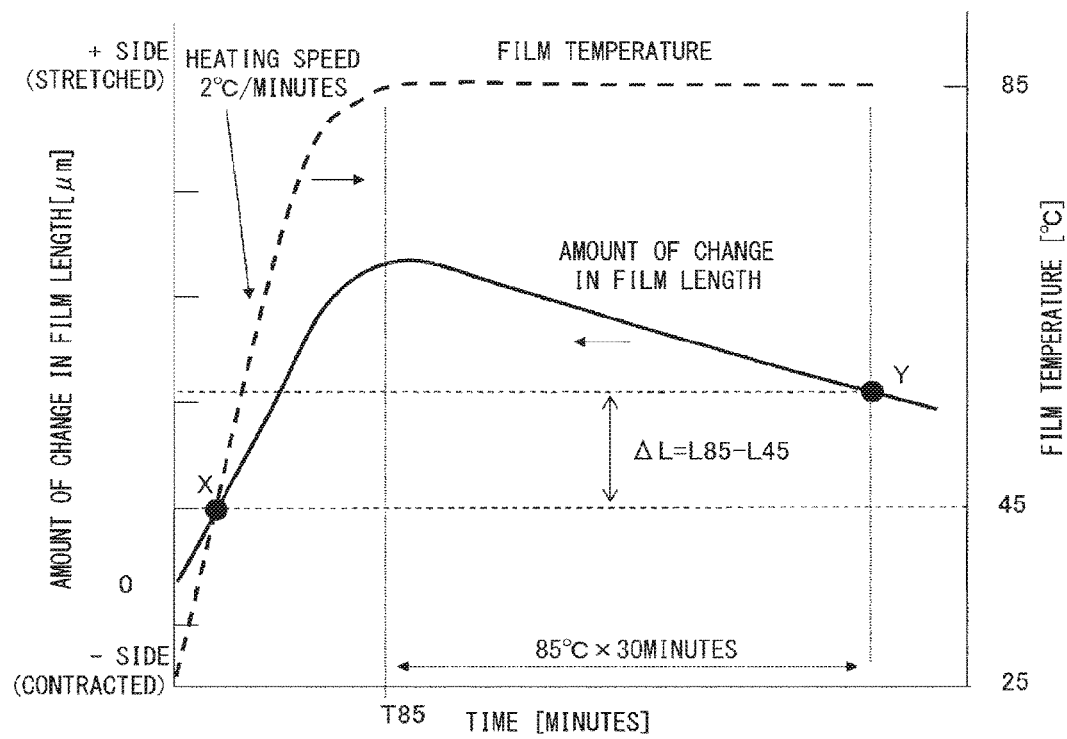
FIG. 2 is a graph showing one example of a heat shrinkage evaluation.

FIG. 2 shows one measurement example.

FIG. 2 shows the film temperature (data shown by a dashed line) and an amount of change in the film length (data shown by a solid line) with respect to the time from the start of the measurement.

The temperature of the film when the measurement is started is 25° C. and the amount of change in the film length at this time is 0 μm.

After the measurement is started, the test piece is heated from 25° C. to 85° C. at a heating speed of 2° C./min. The time when the test piece is heated to 85° C. is T85 (min).

In FIG. 2, while the test piece is heated from 25° C. to 85° C. at a heating speed of 2° C./min, the film length is increased with time.

When the test piece is heated from 25° C. to 85° C. at a heating speed of 2° C./min, the length of the test piece L45 (mm) when the test piece is heated to 45° C. is measured (measurement point X in the graph).

After the test piece is heated from 25° C. to 85° C. at a heating speed of 2° C./min, the temperature of the test piece is kept at 85° C. for 30 minutes. In FIG. 2, while the temperature of the test piece is being kept at 85° C. for 30 minutes, the film length is decreased with time.

The length of the test piece L85 (mm) after the test piece is kept at 85° C. for 30 minutes is measured (measurement point Y in the graph).

The value of L85−L45 is obtained as ΔL.

In FIG. 2, ΔL=L85−L45>0.

The aforementioned deformation rate is obtained using the obtained value of ΔL.

The biaxially stretched film according to the present invention exhibits small heat shrinkage and has excellent dimensional stability, whereby winding wrinkles, winding deviation, winding squeeze and the like are suppressed and thus can be wound up without any problem.

The application of the biaxially stretched film according to the present invention is not particularly limited and may be suitably used for optical applications such as polarizer protective films, liquid crystal protection plates, surface materials of mobile information terminals, display window protection films of the mobile information terminals, light guide films, transparent conductive films having surfaces onto which silver nanowires or carbon nanotubes are applied, and front plates of various types of displays.

The biaxially stretched film according to the present invention can be suitably used, in particular, for polarizer protective films.

The biaxially stretched film according to the present invention can be suitably used for, besides being applied to optical purposes as described above, infrared-ray cutoff films, crime preventive films, scattering preventing films, decorative films, photovoltaic back sheets, front sheets for flexible solar cells, shrink films, films for in-mold labels and the like.

When the above film is applied to the polarizer protective films and the like, an in-plane direction retardation Re with respect to light having a wavelength of 590 nm is, under a condition in which the film thickness is 40 μm, preferably −5 to 5 nm, more preferably −4 to 4 nm, still more preferably −3 to 3 nm, particularly preferably −2 to 2 nm, and most preferably −1 to 1 nm.

When the above film is applied to the polarizer protective films and the like, a thickness direction retardation Rth with respect to light having a wavelength of 590 nm is, under a condition in which the film thickness is 40 μm, preferably −5 to 5 nm, more preferably −4 to 4 nm, still more preferably −3 to 3 nm, particularly preferably −2 to 2 nm or smaller, and most preferably −1 to 1 nm.

When the in-plane retardation Re and the thickness direction retardation Rth are within the aforementioned ranges, influences on display characteristics of the liquid crystal display device due to the retardation may be substantially suppressed. Specifically, interference unevenness or distortion of 3D images when the biaxially stretched film is used for a liquid crystal display device for 3D display may be substantially suppressed.

The in-plane direction retardation Re and the thickness direction retardation Rth are respectively defined by the following expressions:

$$Re=(nx-ny)\times d,$$

$$Rth=((nx+ny)/2-nz)\times d$$

wherein nx denotes a refractive index of the film in a slow axis direction, ny denotes a refractive index of the film in a fast axis direction, nz denotes a refractive index of the film in the thickness direction, and d (nm) denotes the thickness of the film. The term "slow axis" refers to the direction in which the refractive index in the film surface becomes maximum and the term "fast axis" refers to the direction vertical to the slow axis in the surface.

The biaxially stretched film according to the present invention is preferably used for decorative films.

When printing on the decorative film is carried out or when another film is layered on the decorative film using adhesive, for example, the decorative film is preferably dried with hot air at about 80° C. for the purpose of improving volatilization of the solvent component or adhesion.

By using the biaxially stretched film according to the present invention which exhibits small heat shrinkage and has excellent dimensional stability as the decorative film, the heat shrinkage of the film in the aforementioned process of drying the film with hot air can be suppressed and defects of the product such as positional deviation due to the heat shrinkage can be suppressed.

The biaxially stretched film according to the present invention may be layered with another desired resin film and can be used as a form of a layered film.

Since the biaxially stretched film according to the present invention exhibits small heat shrinkage and has excellent dimensional stability, when being layered with the other resin film, occurrence of warpage or curl of the film is suppressed.

The biaxially stretched film according to the present invention can further be bonded to a non-resin material such as metal or wood and can thus be used in the form of a layered body.

The biaxially stretched film according to the present invention exhibits small heat shrinkage and has excellent dimensional stability. Therefore, by bonding the biaxially stretched film to the non-resin material such as metal or wood, it is possible to prevent the film from being peeled off due to a temperature change.

(Unstretched Thermoplastic Resin Film (Original Film Before Stretching))

In the method of manufacturing the biaxially stretched film according to the present invention, an unstretched thermoplastic resin film (original film before stretching) composed of at least one thermoplastic resin layer is used.

The compositions of the thermoplastic resin layer are not particularly limited.

The thermoplastic resin used for the thermoplastic resin layer may be:

an olefin resin such as polyethylene, polypropylene, ethylene-propylene copolymer, and poly(4-methyl-1-pentene);

a cyclic olefin resin such as polycyclo-olefin and polynorbornene;

a halogen-containing resin such as a vinyl chloride resin;

a styrene resin such as polystyrene, styrene-methyl methacrylate copolymer, styrene-acrylonitrile copolymer, α-methylstyrene-methyl methacrylate copolymer, acrylonitrile-butadiene-styrene block copolymer;

a (meth)acrylic resin such as a homopolymer of (meth)acrylate ester, a copolymer of (meth)acrylate ester, a copolymer of (meth)acrylate ester and N-substituted maleimide, a copolymer of (meth)acrylate ester and (meth)acrylic acid anhydride, and a copolymer of (meth)acrylate ester and glutarimide;

an ester resin such as polyethylene terephthalate, polybutylene terephthalate, and polyethylene naphthalate;

an amid resin such as nylon 6, nylon 66, and nylon 610;

a cellulose resin such as triacetyl cellulose;

an acetal resin;

a carbonate resin;

a phenylene-oxide resin;

a phenylene-sulfide resin;
an etheretherketone resin;
an ether nitrile resin;
a sulfone resin;
an ethersulfone resin;
an oxybenzylene resin;
an amide-imide resin;
a phenoxy resin; and
a maleimide resin.

The thermoplastic resin layer may include one or more types of the aforementioned thermoplastic resins.

Among the aforementioned thermoplastic resins, non-crystalline thermoplastic resins are useful for optical applications and the like.

At least one thermoplastic resin layer that composes the unstretched thermoplastic resin film preferably includes a non-crystalline thermoplastic resin.

The non-crystalline thermoplastic resin may be, for example:
a cyclic olefin resin such as polycycloolefin;
a halogen-containing resin;
a styrene resin;
a (meth)acrylic resin;
a cellulose resin such as triacetyl cellulose;
a carbonate resin;
a phenylene-oxide resin;
a sulfone resin;
an ethersulfone resin;
a phenoxy resin; and
a maleimide resin.

At least one thermoplastic resin layer that composes the unstretched thermoplastic resin film may include one or more types of the above non-crystalline thermoplastic resins.

In particular, at least one thermoplastic resin layer that composes the unstretched thermoplastic resin film preferably includes at least one type of non-crystalline thermoplastic resin selected from the group consisting of the (meth)acrylic resin, the cyclic olefin resin, the carbonate resin, the phenoxy resin, and the maleimide resin.

In terms of the transparency, at least one thermoplastic resin layer that composes the unstretched thermoplastic resin film preferably includes at least the (meth)acrylic resin.

In terms of the heat resistance, at least one thermoplastic resin layer that composes the unstretched thermoplastic resin film preferably includes at least a cyclic olefin resin.

The thermoplastic resin layer may further include, in accordance with the aforementioned thermoplastic resin, rubbery polymers such as a thermoplastic polyurethane elastomer, a thermoplastic polyester elastomer, an ionomer resin, a styrene-butadiene block polymer, an acrylic block polymer, an ethylene-propylene rubber, a butadiene resin, and an acrylic rubber.

In the application such as the polarizer protective films, in terms of the transparency and the retardation, at least one thermoplastic resin layer that composes the unstretched thermoplastic resin film preferably includes at least the (meth)acrylic resin.

The (meth)acrylic resin is a resin including at least one type of monomer unit derived from (meth)acrylate ester.

In the application such as the polarizer protective films, a methacryl resin in which the content of a monomer unit derived from methyl methacrylate (MMA) is 90 mass % or more is preferably used.

The above methacryl resin may include, besides the monomer unit derived from methyl methacrylate (MMA), one or more types of monomer units.

The other monomer units may include a monomer unit derived from, for example:
(meth)acrylate alkyl ester such as methyl acrylate, ethyl (meth)acrylate, propyl (meth)acrylate, butyl (meth)acrylate, and 2-ethylhexyl(meth)acrylate;
(meth)acrylate aryl ester such as phenyl (meth)acrylate;
(meth)acrylate cycloalkyl ester such as cyclohexyl (meth)acrylate and norbornenyl (meth) acrylate; and
vinyl monomers having a polymerizable carbon-carbon double bond in one molecule, such as (meth)acrylamide and (meth)acrylonitrile.

In the applications such as the polarizer protective films, a film having a high transparency, a small retardation in the thickness direction, a small heat shrinkage, a uniform thickness, and an excellent surface smoothness can be obtained.

Therefore, at least one thermoplastic resin layer that composes the unstretched thermoplastic resin film preferably includes a methacryl resin (X) in which a triad syndiotacticity (rr) is 50% or larger, a mass average molecular weight (Mw) is 80,000 to 200,000, the content of the monomer unit derived from methyl methacrylate (MMA) is 92 mass % or more.

A methacryl resin having a high molecular weight with a molecular weight of 200,000 or more can be added to the thermoplastic resin layer as necessary for the purpose of reducing the thickness unevenness of the film or the like. When the amount of the high molecular weight component with a molecular weight of 200,000 or more is too small, the effect of reducing the thickness unevenness of the film cannot be sufficiently attained and when the amount of the high molecular weight component is too large, the film may become yellow.

The additive amount of the high-molecular weight component with a molecular weight of 200,000 or more with respect to the methacryl resin (X) is preferably about 0.5 to 6 phr, for example.

In the applications such as the polarizer protective films, a film having a high transparency, a small retardation in the thickness direction, a small heat shrinkage, a uniform thickness, and an excellent surface smoothness can be obtained.

Therefore, at least one thermoplastic resin layer that composes the unstretched thermoplastic resin film preferably includes:
a methacryl resin (X) in which a triad syndiotacticity (rr) is 50% or larger, a mass average molecular weight (Mw) is 80,000 to 200,000, and the content of the monomer unit derived from methyl methacrylate (MMA) is 92 mass % or more; and
a carbonate resin (Y) in which a melt volume flow rate (MVR) measured at 300° C., with a load of 1.2 kg, for 10 minutes in compliance with JIS K7210 is 130 to 250 $cm^3/10$ min.

The triad syndiotacticity (rr) (hereinafter it may be simply referred to as "syndiotacticity (rr)") is a rate that both the two chains (diad) of three successive monomer unit chains (triad) are racemo (it is abbreviated as rr). When the configuration of the chains (diad) of the monomer units in the polymer molecules is the same, this configuration is referred to as meso. When they have configurations different from each other, this configuration is referred to as racemo. Meso and racemo are respectively shown by m and r.

The syndiotacticity (rr) (%) of the methacryl resin (X) can be calculated by Expression: $(X/Y) \times 100$ by measuring a $^1$H-NMR spectrum at 30° C. in deuterated chloroform and measuring, from the spectrum, the area (X) of the region from 0.6 to 0.95 ppm and the area (Y) of the region from 0.6 to 1.35 ppm when the reference substance (TMS) is set to 0 ppm.

The lower limit of the triad syndiotacticity (rr) of the methacryl resin (X) is 50%, preferably 55%, more preferably 58%, still more preferably 59%, and particularly preferably 60%.

In view of the film forming, the upper limit of the triad syndiotacticity (rr) of the methacryl resin (X) is preferably 99%, more preferably 85%, still more preferably 77%, particularly preferably 65%, and most preferably 64%.

The mass average molecular weight (Mw) of the methacryl resin (X) is 80,000 to 200,000, preferably 85,000 to 160,000, and particularly preferably 90,000 to 120,000.

When the mass average molecular weight (Mw) of the methacryl resin (X) is 80,000 or larger and the syndiotacticity (rr) is 50% or higher, a film that has a high toughness and can be easily stretched is obtained. It is therefore possible to reduce the thickness of the film. Further, when the mass average molecular weight (Mw) of the methacryl resin (X) is 200,000 or smaller, the molding processability of the methacryl resin is increased, whereby a film having a uniform thickness and an excellent surface smoothness is obtained.

The method of manufacturing the methacrylic resin (X) having the aforementioned properties is not particularly limited. The properties such as the mass average molecular weight (Mw) and the syndiotacticity (rr) can be adjusted by adjusting a polymerization temperature, a polymerization time, the type and/or the amount of a chain transfer agent, or the type and/or amount of a polymerization initiator using, for example, a known polymerization method such as a radical polymerization method or an anion polymerization method.

The carbonate resin (Y) is a polymer obtained by a reaction of a polyfunctional hydroxy compound and a carbonic acid ester forming compound.

An aromatic carbonate resin is preferably used as the carbonate resin (Y) in terms of the compatibility with the methacryl resin (X) and the transparency of the resultant film.

The method of manufacturing the aromatic carbonate resin is not particularly limited and a phosgene method (interfacial polymerization method), a fusion polymerization method (transesterification method) or the like may be used, for example.

The aromatic carbonate resin may be manufactured by performing processing for adjusting the terminal hydroxy groups on the carbonate resin material manufactured by the fusion polymerization method in advance.

The polyfunctional hydroxy compound is not particularly limited and may be:
4,4'-dihydroxybiphenyls;
bis(hydroxyphenyl)alkanes;
bis(4-hydroxyphenyl)ethers;
bis(4-hydroxyphenyl)sulfides;
bis(4-hydroxyphenyl)sulfoxides;
bis(4-hydroxyphenyl)sulfones;
bis(4-hydroxyphenyl)ketones;
bis(hydroxyphenyl)fluorenes;
dihydroxy-p-terphenyls;
dihydroxy-p-quaterphenyls;
bis(hydroxyphenyl)pyrazines;
bis(hydroxyphenyl)menthanes;
bis[2-(4-hydroxyphenyl)-2-propyl]benzenes;
dihydroxynaphthalenes;
dihydroxybenzenes;
polysiloxanes; and
dihydroperfluoroalkanes.

They may have substituents

One or more types of the above compounds may be used.

Among these polyfunctional hydroxy compounds, 2,2-bis (4-hydroxyphenyl)propane, 1,1-bis(4-hydroxyphenyl)cyclohexane, bis(4-hydroxyphenyl)diphenylmethane, 1,1-bis (4-hydroxyphenyl)-1-phenylethan, 2,2-bis(4-hydroxy-3-methylphenyl)propane, 2,2-bis(4-hydroxy-3-phenylphenyl) propane, 4,4'-dihydroxybiphenyl, bis(4-hydroxyphenyl) sulfone, 2,2-bis(3,5-dibromo-4-hydroxyphenyl)propane, 3,3-bis(4-hydroxyphenyl)pentane, 9,9-bis(4-hydroxy-3-methylphenyl)fluorene, bis(4-hydroxyphenyl)ether, 4,4'-dihydroxybenzophenone, 2,2-bis(4-hydroxy-3-methoxyphenyl)1,1,1,3,3,3-hexafluoropropane, α,ω-bis[3-(2-hydroxyphenyl)propyl]polydimethylsiloxane, resorcin, 2,7-dihydroxy naphthalene or the like is preferable.

Among them, 2,2-bis(4-hydroxyphenyl)propane or the like is preferable.

The carbonic acid ester forming compound is not particularly limited and may be a carbonic acid ester compound such as:
various dihalogenated carbonyl such as phosgene;
haloformate such as chloroformate; and
a carbonic acid ester compound such as bisarylcarbonate.

One or more types of the above compounds may be used.

The amount of the carbonic acid ester forming compound is appropriately adjusted taking the chemical stoichiometric ratio (equivalent) of the reaction into consideration.

The reaction of the polyfunctional hydroxy compound and the carbonic acid ester forming compound is typically performed in a solvent in the presence of an acid binder.

The acid binder may be:
alkali metal hydroxides such as sodium hydroxide, potassium hydroxide, lithium hydroxide, cesium hydroxide or the like;
alkali metal carbonates such as sodium carbonate, potassium carbonate or the like;
tertiary amines such as trimethylamine, triethylamine, tributylamine, N,N-dimethylcyclohexylamine, pyridine, and dimethylaniline;
quaternary ammonium salts such as trimethylbenzyl ammonium chloride, triethylbenzyl ammonium chloride, tributylbenzyl ammonium chloride, trioctylmethyl ammonium chloride, tetrabutyl ammonium chloride, and tetrabutyl ammonium bromide; and
quaternary phosphonium salts such as tetrabutyl phosphonium chloride and tetrabutyl phosphonium bromide.

One or more types of the above acid binders may be used.

The amount of the acid binder may be appropriately adjusted taking the chemical stoichiometric ratio (equivalent) of the reaction into consideration.

Specifically, the amount is one equivalent or excessive equivalent amount, more preferably 1 to 5 equivalents, per mole of the hydroxide group of the polyfunctional hydroxy compound as the raw material.

As necessary, a small amount of an antioxidant such as sodium sulfite and hydrosulfite may be added to this reaction system.

A known chain end terminator can be used as necessary for the reaction of the polyfunctional hydroxy compound and the carbonic acid ester forming compound.

The chain end terminator may be p-tert-butylphenol, p-phenylphenol, p-cumylphenol, p-perfluorononylphenol, p-(perfluorononylphenyl)phenol, p-(perfluorohexylphenyl) phenol, p-tert-perfluorobutylphenol, 1-(P-hydroxybenzyl) perfluorodecane, p-[2-(1H,1H-perfluorotridodecyloxy)-1,1, 1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanic acid, 1,1,1,3,3,3-hexafluoro-2-propanol p-(perfluoroxylphenyl)phenol or the like.

One or more types of the above chain end terminators may be used.

A known branching agent can be used as necessary for the reaction of the polyfunctional hydroxy compound and the carbonic acid ester forming compound.

The branching agent may be fluoroglycine, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)-heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl) phenylmethane, 2,2-bis[4,4-bis(4-hydroxyphenyl) cyclohexyl]propane, 2,4-bis[2-bis(4-hydroxyphenyl)-2-propyl] phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl) methane, tetrakis[4-(4-hydroxyphenyl isopropyl)phenoxy] methane, 2,4-dihydroxybenzoate, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin or the like.

One or more types of the above branching agents may be used.

The carbonate resin (Y) may include, besides the polycarbonate unit, one or more types of other polymer units such as a polyester unit, a polyurethane unit, a polyether unit, or a polysiloxane unit.

The MVR of the carbonate resin (Y) measured at 300° C., with a load of 1.2 kg, for 10 minutes is 130 to 250 cm$^3$/10 min, preferably 150 to 230 cm$^3$/10 min, more preferably 180 to 220 cm$^3$/10 min in view of the compatibility with the methacryl resin (X) and transparency and in-plane uniformity of the resultant film.

In the applications such as the polarizer protective films, the mass ratio of the methacryl resin (X) to the carbonate resin (Y) in the thermoplastic resin layer (methacryl resin (X)/carbonate resin (Y)) is preferably 91/9 to 99/1 and more preferably 94/6 to 98/2.

In the applications such as the polarizer protective films, the total amount of the methacryl resin (X) and the carbonate resin (Y) in the thermoplastic resin layer is preferably 80 to 100 mass %, more preferably 90 to 100 mass %, still more preferably 94 to 100 mass %, and particularly preferably 96 to 100 mass %.

The thermoplastic resin layer may include a resin other than the methacryl resin (X) and the carbonate resin (Y) or one or more types of additives as necessary.

In the thermoplastic resin layer including the methacryl resin (X) and the carbonate resin (Y), the compatibility of these resins is high, which means these resins are homogeneously compatibilized at a nano-order level in the thermoplastic resin layer. It is therefore possible to obtain a film having a high transparency.

The thermoplastic resin film including the thermoplastic resin layer including the methacryl resin (X) and the carbonate resin (Y) is suitable for the applications such as the polarizer protective films since the retardation in the thickness direction remains to be small even when the thermoplastic resin film is biaxially stretched.

Further, the thermoplastic resin film including the thermoplastic resin layer including the methacryl resin (X) and the carbonate resin (Y) has a high heat resistance. It is therefore possible to obtain a film in which the heat shrinkage after the biaxial stretching is small.

The biaxially stretched film obtained using the thermoplastic resin film including the thermoplastic resin layer including the methacryl resin (X) and the carbonate resin (Y) has a high transparency, a small retardation in the thickness direction, a uniform thickness, an excellent surface smoothness, exhibits small heat shrinkage and has excellent dimensional stability, and can thus be suitably used for various applications.

See Japanese Patent Application No. 2014-010844 (not yet open to the public at the time the present application was filed), which had already been filed by the applicant before this application was filed, for the details of the thermoplastic resin including the methacryl resin (X) and the carbonate resin (Y).

In the application of the polarizer protective film or the like, a film having a high transparency, a small retardation in the thickness direction, a small heat shrinkage, a uniform thickness, and an excellent surface smoothness can be obtained.

Therefore, at least one thermoplastic resin layer that composes the unstretched thermoplastic resin film preferably includes:

a methacryl resin (X) in which the triad syndiotacticity (rr) is 50% or larger, the mass average molecular weight (Mw) is 80,000 to 200,000, the content of the monomer unit derived from methyl methacrylate (MMA) is 92 mass % or more; and a phenoxy resin (Z).

The phenoxy resin (Z) is a high molecular weight epoxy resin having thermoplasticity and is polyhydroxy polyether having a structural unit including a hydroxy group and an aromatic ring.

Specifically, the phenoxy resin (Z) includes 50 mass % or more of one or two types of structural units expressed by the following Formula (11).

[Formula 1]

In the above Formula (11), X is a divalent group including at least one benzene ring and R is a linear or branched alkylene group having 1 to 6 carbon atoms.

In the above Formula (11), X is preferably a divalent group derived from the compound expressed by one of the following Formulae (12) to (14).

The positions of the two bonds of the divalent group are not particularly limited as long as it is structurally acceptable. A divalent group that forms two bonds by a removal of two hydrogen atoms from one or a plurality of benzene rings in the following Formulae (12) to (14) is preferably used.

In particular, a divalent group that forms two bonds by a removal of two hydrogen atoms from a plurality of benzene rings in the following Formulae (12) and (14) is preferably used.

[Formula 2]

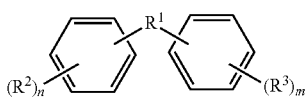
(12)

In the aforementioned Formula (12), $R^1$ is a linear or branched alkylene group having 1 to 6 carbon atoms or a cycloalkylene group or a cycloalkylidene group having 3 to 20 carbon atoms.

The symbol $R^1$ may not include an atom and directly couple the two benzene rings. In this case, the compound expressed by Formula (12) has a naphthalene structure or a biphenyl structure.

The symbols $R^2$ and $R^3$ are independently hydrogen atoms, a linear or branched alkyl group having 1 to 6 carbon atoms or a linear or branched alkenyl group having 2 to 6 carbon atoms.

The symbols n and m are independently integers from 1 to 4.

[Formula 3]

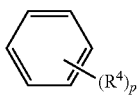
(13)

In the above Formula (13), $R^4$ is a hydrogen atom, a linear or branched alkyl group having 1 to 6 carbon atoms, or a linear or branched alkenyl group having 2 to 6 carbon atoms.

The symbol p is an integer from 1 to 4.

[Formula 4]

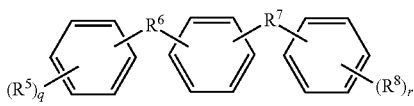
(14)

In the above Formula (14), $R^6$ and $R^7$ are independently a linear or branched alkylene group having 1 to 6 carbon atoms or a cycloalkylene group or a cycloalkylidene group having 3 to 20 carbon atoms.

The symbols $R^6$ and/or $R^7$ may not include atoms and directly couple two benzene rings. In this case, the compound expressed by Formula (14) has a naphthalene structure or a biphenyl structure.

The symbols $R^5$ and $R^8$ are independently hydrogen atoms, a linear or branched alkyl group having 1 to 6 carbon atoms or a linear or branched alkenyl group having 2 to 6 carbon atoms.

The symbols q and r are independently integers from 1 to 4.

In the above Formula (11), X may be a divalent group derived from aromatic hydrocarbon having a tricyclic ring structure. In this case, X has, for example, a fluorene structure and a carbazole structure.

The compounds expressed by the above Formulae (12) to (14) may be divalent phenol derivatives shown in the following [Formula 5], but are not limited to them.

In the above Formula (11), X is preferably a divalent group in which two bonds are formed by removing two hydrogen atoms from one or a plurality of benzene rings in the divalent phenol derivatives shown in the following [Formula 5]. In particular, X is preferably a divalent group in which two bonds are formed by removing two hydrogen atoms from a plurality of different benzene rings.

[Formula 5]

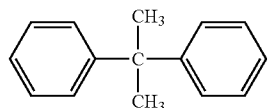

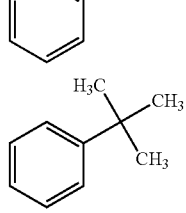

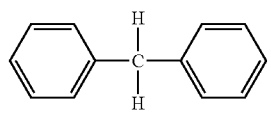

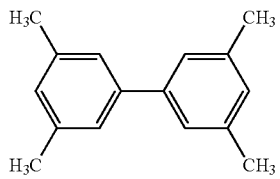

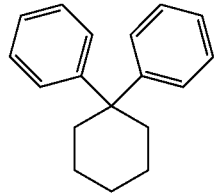

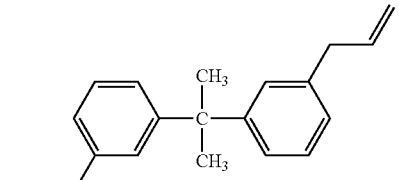

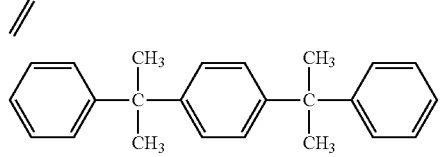

The structural unit expressed by the following Formula (16) is particularly preferable as the structural unit expressed by the above Formula (11).

The phenoxy resin (Z) preferably includes at least one type of structural unit expressed by the following Formula (16) and includes 10 to 1,000 structural units in one molecule.

[Formula 6]

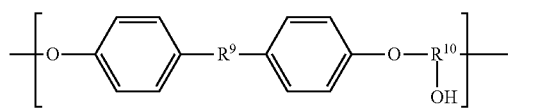

(16)

In the above Formula (16), $R^9$ is a linear or branched alkylene group having 1 to 6 carbon atoms or a cycloalkylene group or a cycloalkylidene group having 3 to 20 carbon atoms.

The symbol $R^9$ may not include an atom and directly couple two benzene rings. In this case, the compound expressed by Formula (16) has a naphthalene structure or a biphenyl structure.

The symbol $R^{10}$ is a linear or branched alkylene group having 1 to 6 carbon atoms.

The structural unit expressed by the following Formula (17) is particularly preferable as the structural unit expressed by the above Formula (16).

[Formula 7]

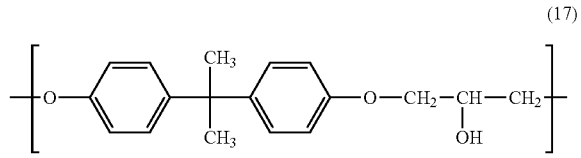

(17)

The phenoxy resin (Z) including the structural unit expressed by above Formula (17) may be a phenoxy resin "YP-50" or "YP-50S" manufactured by NIPPON STEEL & SUMIKIN CHEMICAL CO., LTD., a phenoxy resin "jER series" manufactured by Mitsubishi Chemical Corporation, or a phenoxy resin "PKFE", "PKHJ" or the like manufactured by InChem, all of which being commercially available.

A number average molecular weight (Mn) of the phenoxy resin (Z) is preferably 3,000 to 2,000,000, more preferably 5,000 to 100,000, and particularly preferably 10,000 to 50,000.

When the number average molecular weight (Mn) falls within the above range, the thermoplastic resin layer having a high heat resistance and a high strength and the film including the thermoplastic resin layer can be obtained.

The number of structural units expressed by the above Formula (11) that are present in one molecule of the phenoxy resin (Z) is preferably 10 to 1,000, more preferably 15 to 500, and particularly preferably 30 to 300.

The glass transition temperature (Tg) of the phenoxy resin (Z) is preferably 80° C. or higher, more preferably, 90° C. or higher, and particularly preferably 95° C. or higher.

When the glass transition temperature (Tg) of the phenoxy resin (Z) is lower than 80° C., the heat resistance of the thermoplastic resin layer and the film including the thermoplastic resin layer tends to decrease.

The upper limit of the glass transition temperature (Tg) of the phenoxy resin (Z) is not particularly limited and is typically 150° C.

When the glass transition temperature (Tg) of the phenoxy resin (Z) exceeds 150° C., the thermoplastic resin layer and the film including the thermoplastic resin layer tend to be brittle.

The terminal of the phenoxy resin (Z) preferably does not include epoxy groups.

When the terminal of the phenoxy resin (Z) includes the epoxy groups, a gelled portion tends to be generated in the thermoplastic resin layer and the film including the thermoplastic resin layer.

When the phenoxy resin (Z) includes two or more types of structural units expressed by the above Formula (11), these structural units may be included at random, alternately, or in the form of blocks.

The phenoxy resin (Z) may be produced in a solution or in the absence of solvent by a known method.

The phenoxy resin (Z) may be produced, for example, by a condensation reaction of a divalent phenol compound and epihalohydrin or a polyaddition reaction of a divalent phenol compound and a bifunctional epoxy resin.

The amount of the phenoxy resin (Z) contained in the thermoplastic resin layer is, with respect to 100 parts by mass of methacryl resin (X), preferably 0.1 to 8 parts by mass and more preferably 1 to 6 parts by mass.

If the amount of the phenoxy resin (Z) is less than 0.1 parts by mass, the adhesion of the film tends to decrease. If the amount of the phenoxy resin (Z) exceeds 8 parts by mass, the heat resistance may decrease and the retardation may increase.

The total amount of the methacryl resin (X) and the phenoxy resin (Z) in the thermoplastic resin layer is preferably 80 mass % or more, more preferably 90 to 100 mass %, still more preferably 94 to 100 mass %, and particularly preferably 96 to 100 mass %.

In the method of manufacturing the biaxially stretched film according to the present invention, a layered film composed of a plurality of thermoplastic resin layers can be used for the unstretched thermoplastic resin film (original film before stretching).

The structure of the layered film is not particularly limited and may be, for example:

a two-layer structure including a surface layer/a support layer, a three-layer structure including a surface layer/a support layer/a surface layer, a structure including four or more layers including a surface layer/a plurality of support layers/a surface layer or the like.

The aforementioned layered structure is preferable since the surface layer is in contact with the support layer and the surface layer is finely supported by the support layer. In particular, the three-layer structure including the surface layer/the support layer/the surface layer or the like is preferable from the viewpoint of securing the sliding property and the film-forming stability and suppressing curl and surface scratches.

The resins of the support layer and the surface layer are not particularly limited and known resins may be used.

The total thickness of the layered film is not particularly limited. In order to achieve the high handling property and productivity due to the film having appropriate toughness, the total thickness of the layered film is preferably 20 to 250 μm, more preferably 25 to 200 μm, and particularly preferably 30 to 190 μm.

The method of manufacturing the layered film is not particularly limited and an extrusion molding or the like is preferably used.

In the layered film, the thermoplastic resin layer that is exposed on at least one surface is preferably composed of the thermoplastic resin in which a melt mass flow rate (MFR) measured at 230° C., with a load of 3.8 kg, for 10 minutes in compliance with JIS K7210 is 10 to 15 g/10 min.

It is therefore possible to properly perform the extrusion molding of the layered film.

In order to increase the discharge amount per unit time in the extrusion molding, melt fracture, which is a phenomenon that a shear stress in the die becomes high and the surface of the film becomes rough, may occur. In such a case, by coating the surface layer with a relatively low viscosity material and co-extruding them, it is possible to reduce the shear stress on the wall surface of the die and to suppress the degradation in the surface state.

In the layered film composed of the plurality of thermoplastic resin layers, a thermoplastic resin layer exposed on at least one surface may include fine particles.

The biaxially stretched (meth)acrylic resin film has recently been preferably used for, besides being used for conventional applications, optical elements of optical products such as liquid crystal displays, touch panels and the like. In such applications, the resin film is often layered on the surface of a display body such as the liquid crystal display or the like for use. It is thus required to decrease the thickness of the film so that the thickness of the whole device can be reduced. Generally, however, when the thickness of the film is reduced, the toughness of the film may be reduced and wrinkles or the like may occur in the film in the process of conveying the film.

Further, when the film is wound up onto a core material such as a paper core, the overlapped films need to have a certain level of sliding property: otherwise a winding deviation occurs, the film cannot be stably wound up, and the external appearance of the film roll is degraded.

In order to solve the aforementioned problem, a highly adhesive layer may be layered on the film surface, and fine particles may be added to this highly adhesive layer to allow the film to have toughness and the sliding property.

In other applications, one or both surfaces of the film may be coated with a resin binder to which fine particles are added in order to give the film surface the sliding property and to improve the winding-up property.

The fine particles in the thermoplastic resin layer are not particularly limited and may be organic microparticles, inorganic microparticles, or organic-inorganic composite microparticles.

The fine particles in the thermoplastic resin layer may be silica fine particles, barium sulfate fine particles, alumina fine particles, calcium carbonate fine particles or the like. The silica fine particles are preferably used in view of the transparency.

The shape of the fine particles in the thermoplastic resin layer is not particularly limited. The fine particles may be primary particles having, for example, a spherical shape, or may be agglomerated particles in which primary particles having a spherical shape are agglomerated to form secondary particles.

The fine particles in the thermoplastic resin layer are preferably agglomerated particles.

Since the agglomerated particles can be deformed when the thermoplastic resin film including the thermoplastic resin layer including the agglomerated particles is stretched, bubbles (void) are hardly formed on an interface between the resin and the particles, whereby the biaxially stretched film that can suppress the formation of bubbles in the film and has high transparency can be obtained.

Further, since the agglomerated particles are deformed when the film is stretched, protrusions formed on the film surface have an appropriate shape and height, whereby the biaxially stretched film having excellent transparency and sliding property can be obtained.

When the size of the protrusions formed on the film surface is moderate, an excellent sliding property is obtained even when the amount of fine particles is small.

When the fine particles are too small, the size of the protrusions formed on the film surface becomes too small, and a sufficiently high sliding property may not be obtained. Further, when the fine particles are too small, the fine particles may agglomerate to form coarse particles, which may cause a decrease in the transparency of the film. When the size of the fine particles is too large, the size of the protrusions formed on the film surface becomes too large, which may cause a decrease in the transparency.

The average particle diameter of the fine particles in the thermoplastic resin layer is preferably 0.05 to 5.0 μm, more preferably 0.1 to 5.0 μm, and particularly preferably 1.0 to 5.0 μm. When the average particle diameter falls within the above range, it is possible to moderately disperse the fine particles into the resin and to suppress the agglomeration of the fine particles that have been added to form coarse particles. It is therefore possible to obtain uniform surface irregularities with no coarse protrusions on the film surface and to obtain a biaxially stretched film having excellent transparency and sliding property.

The amount of fine particles included in the thermoplastic resin layer is not particularly limited. The amount of fine particles included in the thermoplastic resin layer is preferably 0.005 to 0.02 mass %, and more preferably 0.01 to 0.015 mass % relative to the mass of the thermoplastic resin layer so that the biaxially stretched film having excellent transparency and sliding property can be obtained.

As described above, according to the present invention, it is possible to provide a biaxially stretched film which is composed of a thermoplastic resin, has an improved toughness, exhibits small heat shrinkage, and has excellent dimensional stability and a method of manufacturing the same.

EXAMPLES

In the following description, Examples according to the present invention and Comparative Examples will be described. The present invention is not limited, however, to the following cases.

"Production Examples of Thermoplastic Resin"

First, the thermoplastic resin for original film before stretching was manufactured.

The evaluation items and evaluation methods in the manufacturing of the thermoplastic resin are as follows.

(Polymerization Conversion)

"Inert CAP 1" manufactured by GL Sciences Inc. (df=0.4 μm, 0.25 mmI.D.×60 m) was connected to a gas chromatograph "GC-14A" manufactured by Shimadzu Corporation as a column. The injection temperature was 180° C. and the detector temperature was 180° C. The column temperature had a temperature profile in which the temperature was kept at 60° C. for five minutes, then raised from 60° C. to 200° C. at a heating speed of 10° C./min, and kept at 200° C. for ten minutes. The measurement was performed under these conditions and the polymerization conversion was calculated based on the obtained result.

(Mass Average Molecular Weight (Mw), Molecular Weight Distribution)

The mass average molecular weight (Mw) and the molecular weight distribution (in this specification, the "molecular weight distribution" is defined by a value (Mw/Mn) obtained by dividing the mass average molecular weight (Mw) by the number average molecular weight (Mn)) were calculated by measuring the chromatogram under the following conditions by a gel permeation chromatography (GPC) and converting the measured value into the molecular weights of standard polystyrene.

"HLC-8320" manufactured by Tosoh Corporation was used as the GPC apparatus. A differential refractive index detector was used as a detector. A column in which two lines of "TSKgel SuperMultipore HZM-M" and one line of "SuperHZ4000", both manufactured by Tosoh Corporation, were connected in series, was used. Tetrahydrofuran (THF) was used as the eluent.

The flow rate of the eluent was 0.35 ml/min. The column temperature was 40° C. A calibration curve was created using 10 data points of standard polystyrene.

The baseline of the chromatogram was a line that connects the point where the inclination of the peak of the GPC chart on the side of the high molecular weight is changed from zero to plus when seen from the earlier retention time and the point where the inclination of the peak of the GPC chart on the side of the low molecular weight is changed from minus to zero when seen from the earlier retention time.

(Triad Syndiotacticity (rr))

The $^1$H-NMR spectrum of the sample was measured using a nuclear magnetic resonance apparatus ("ULTRA SHIELD 400 PLUS" manufactured by Bruker). Deuterated chloroform was used for the solvent. The measurement was carried out under conditions of the room temperature and a cumulative number of 64 times.

The area (X) of the region from 0.6 to 0.95 ppm when the reference substance (TMS) was set to 0 ppm and the area (Y) of the region from 0.6 to 1.35 ppm were measured from the resultant spectrum and the triad syndiotacticity (rr) was calculated from the expression:

$$(X/Y) \times 100.$$

(Glass Transition Temperature Tg)

The glass transition temperature Tg was measured in compliance with JIS K7121.

The DSC curve was measured under conditions that the sample was once heated to 230° C., then cooled to the room temperature, and then again heated from the room temperature to 230° C. at a heating speed of 10° C./min using a differential scanning calorimetry equipment ("DSC-50" manufactured by Shimadzu Corporation). The midpoint glass transition temperature obtained from the resultant DSC curve was set to the glass transition temperature Tg.

(Production Example 1) Production of Methacryl Resin (PMMA)

The inside of an autoclave equipped with a stirrer and a sampling tube was replaced by nitrogen. Then 100 parts by mass of purified methyl methacrylate (MMA), 0.0052 parts by mass of 2,2'-azobis(2-methylpropionitrile (hydrogen abstraction ability: 1%, one-hour half-life temperature: 83° C.), and 0.225 parts by mass of n-octyl mercaptan were poured and the resultant solution was stirred to obtain a raw material solution. Nitrogen was delivered into the raw material solution and the dissolved oxygen in the raw material solution was removed.

The raw material solution was poured into a tank reactor connected to the autoclave by a pipe up to ⅔ of the volume. The polymerization reaction was started first by a batch method in a state in which the temperature was kept at 140° C. When the polymerization conversion became 55 mass %, the raw material solution was supplied from the autoclave to the tank reactor at a flow rate in which the average residence time becomes 150 minutes while maintaining the temperature at 140° C., and at the same time, the polymerization reaction of the batch method was switched to the polymerization reaction of the continuous flow type in which the reaction liquid was extracted from the tank reactor at a flow rate corresponding to the supply flow rate of the raw material solution. After the batch method was switched to the continuous flow type, the polymerization conversion in the steady state was 55 mass %.

The reaction liquid that was removed from the tank reactor which has been in the steady state was supplied to a multitubular heat exchanger having an inner temperature of 230° C. at a flow rate in which the average residence time was two minutes and then heated. Then the reaction liquid that has been heated was introduced into a flash evaporator and a volatile component mainly composed of an unreacted monomer was removed to obtain a molten resin. The molten resin from which the volatile component has been removed was supplied to a twin-screw extruder with the inner temperature of 260° C., was discharged in a strand shape, cut by a pelletizer to obtain a methacryl resin (X1) in the form of pellets.

The properties of the resultant methacryl resin (X1) are shown in Table 1-1.

(Production Example 2) Production of Methacryl Resin (PMMA)

The inside of a 5-L glass reaction vessel to which a stirring blade and a three-way cock were attached was replaced by nitrogen. Then the reaction vessel was equipped with 1600 g of toluene, 2.49 g (10.8 mmol) of 1,1,4,7,10,10-Hexamethyltriethylenetetramine, 53.5 g (30.9 mmol) of toluene solution of isobutylbis (2,6-di-t-butyl-4-methylphenoxy) aluminum with a concentration of 0.45 M, and 6.17 g (10.3 mmol) of sec-butyllithium solution (solvent: 95 mass % of cyclohexane, 5 mass % of n-hexane) with a concentration of 1.3 M under the room temperature. Then 550 g of distilled and purified methyl methacrylate (MMA) was dropwise added for 30 minutes to the resultant material with stirring at 20° C. After completion of the dropwise addition, the resultant solution was stirred at 20° C. for 90 minutes. The color of the solution was changed from yellow to colorless. The polymerization conversion of methyl methacrylate (MMA) at this time was 100%.

Then 1500 g of Toluene was added to the resultant solution to dilute it. Then the dilution was poured into 100 kg of methanol to obtain a precipitate. The resultant precipitate was dried for 24 hours at 80° C. and 140 Pa to obtain a methacryl resin (X2).

The properties of the resultant methacryl resin (X2) are shown in Table 1-1.

(Production Example 3) Production of Methacryl Resin (PMMA)

Forty three parts by mass of methacryl resin (X1) obtained in Production Example 1 and 57 parts by mass of methacryl resin (X2) obtained in Production Example 2 were mixed and the resultant mixture was kneaded and extruded at 250° C. using a twin-screw extruder ("KZW20TW-45MG-NH-600" manufactured by TECHNOVEL CORPORATION) to obtain a methacryl resin (X3).

The properties of the resultant methacryl resin (X3) are shown in Table 1-1.

(Production Example 4) Production of Blend Resin of Methacryl Resin (PMMA) and Carbonate Resin (PC)

"SD POLYCA TR-2001" manufactured by Sumika Styron Polycarbonate Limited was prepared as a carbonate resin (Y1). In this carbonate resin (Y1), the melt volume flow rate (MVR) at 300° C. and a load of 1.2 Kg was 200 cm$^3$/10 min, the mass average molecular weight (Mw) was 22,100 g/mol, the molecular weight distribution was 1.81, and the glass transition temperature Tg was 141° C.

"Paraloid K125-P" manufactured by Kureha Chemical Industry was prepared as a processing aid.

Ninety five parts by mass of methacryl resin (X3) obtained in Production Example 3, 3 parts by mass of the carbonate resin (Y1), and 2 parts by mass of the processing aid were mixed and the mixture was kneaded and extruded at 250° C. using a twin-screw extruder ("KZW20TW-45MG-NH-600" manufactured by TECHNOVEL CORPORATION) to obtain a blend resin (B1).

The raw material compositions of the blend resin (B1) are shown in Table 1-2.

(Production Example 5) Production of Blend Resin of Methacryl Resin (PMMA) and Carbonate Resin (PC)

The blend resin (B2) was obtained by the similar method as that in Production Example 4 except that the amount of the methacryl resin (X3) obtained in Production Example 3 was changed from 95 parts by mass to 93 parts by mass and the amount of the carbonate resin (Y1) was changed from 3 parts by mass to 5 parts by mass.

The raw material compositions of the blend resin (B2) are shown in Table 1-2.

"Production Examples of Original Film Before Stretching (Unstretched Thermoplastic Resin Film)"

The original film before stretching (unstretched thermoplastic resin film) was produced using the thermoplastic resin obtained in Production Examples 1, 4, and 5.

(Production Example 6) Thermoplastic Resin Film (F1) (Film of Methacryl Resin (X1))

The methacryl resin (X1) obtained in Production Example 1 was dried at 80° C. for 12 hours and then the dried resin was supplied to a 20 mmφ single-screw extruder (manufactured by OCS). After the resin was melt-kneaded at a cylinder temperature of 260° C., the resin was extruded from a T-die to form the film continuously by four cooling rolls that rotate at the same speed at a take-off speed of 10 m/min, to thereby obtain a non-crystalline thermoplastic resin film (F1). The width of the resultant film (F1) was 500 mm and the average thickness thereof in the width direction was 180 μm.

The numbers of the raw resin and the numbers and the compositions of the thermoplastic resin film are shown in Table 1-3.

(Production Example 7) Thermoplastic Resin Film (F2) (Film of Blend Resin (B1))

A non-crystalline thermoplastic resin film (F2) was obtained in the same method as that in Production Example 6 except that the blend resin (B1) was used in place of the methacryl resin (X1).

The numbers of the raw resin and the numbers and the compositions of the thermoplastic resin films are shown in Table 1-3.

(Production Example 8) Thermoplastic Resin Film (F3) (Film of Blend Resin (B2))

A non-crystalline thermoplastic resin film (F3) was obtained in the same method as that in Production Example 6 except that the blend resin (B2) was used in place of the methacryl resin (X1).

The numbers of the raw resin and the numbers and the compositions of the thermoplastic resin film are shown in Table 1-3.

"Solid Viscoelasticity Measurement"

A strip-shaped test piece having a length of 20 mm×width of 5 mm×thickness of 180 μm was cut out of each original film before stretching (unstretched thermoplastic resin film) obtained from Production Examples 6 to 8. The longitudinal direction of the test piece was made parallel to the longitudinal direction (MD) of the original film.

A tensile amplitude distortion was applied to the test piece using "Rheogel-E4000" manufactured by UBM as a measurement device to measure the storage elastic modulus curve (DMTA curve). The measured temperature range was 25 to 200° C., the heating speed was 3° C./min, the frequency was 1 Hz, and the strain amplitude was 0.3%.

From the storage elastic modulus curve, the temperature regions of the glass region, the glass-to-rubber transition region, and the rubbery plateau region were obtained.

The results of the evaluation are shown in Table 1-3.

It is difficult to obtain the accurate temperature of the boundary between the rubbery plateau region and the flow region. Therefore, the upper limit of the rubbery plateau region is not particularly stated.

In the flow region, the shape of the film cannot be maintained and the stretching cannot be performed. Since the film can be stretched in Examples 1 to 11 and Comparative Examples 1 to 4 that will be described later, it can be assumed that a temperature equal to or higher than the lower limit in the rubbery plateau region is the temperature in the rubbery plateau region in these Examples and Comparative Examples.

"Production of Biaxially Stretched Film"

In the following Examples and Comparative Examples, the biaxially stretched film was produced.

The evaluation items and the evaluation methods of the biaxially stretched film obtained in the respective Examples are as follows.

(Deformation Rate after Heating (Evaluation of Heat Shrinkage))

A test piece having a length of 20 mm, a width of 5 mm, and a thickness of 45 μm was cut out of the biaxially stretched film. The longitudinal direction of the test piece was made parallel to the width direction (TD side) of the original film before stretching.

The both of the end parts (parts spaced apart from both ends by 5 mm) of the test piece in the longitudinal direction were held by a pair of film chucks. At this time, the distance between the pair of film chucks was set to 10 mm. Then 2 g of a pulling load was applied to the biaxially stretched film by the pair of film chucks and the test piece was attached to a stress/distortion controlled thermomechanical analyzer (TMA).

In a state in which the test piece was set as stated above, the test piece was heated from 25° C. to 85° C. at a heating speed of 2° C./min and was further maintained at 85° C. for 30 minutes. The length of the test piece (L85) just after the heating was completed was measured.

In a state in which the test piece was set as stated above, the length of the test piece (L45) when the test piece was heated from 25° C. to 45° C. at a heating speed of 2° C./min was measured.

The value of L85-L45 was calculated as ΔL and the deformation rate (%) expressed by the following Expression (1) was calculated. The dimensional change after the heating was evaluated.

Deformation rate (%)=ΔL (mm)/10 (mm)×100     (1)

(Presence or Absence of Wrinkles in Both of End Parts of Biaxially Stretched Film)

The both of the end parts of the biaxially stretched film in the width direction were visually observed to evaluate the presence or the absence of wrinkles based on the following criteria.

Present (poor): barely noticeable wrinkles were observed.
Absent (good): no wrinkles were found or, if any, negligible.
(Evaluation of Decorative Film)

Acrylic coating liquid (manufactured by Seiko advance Ltd., one-liquid evaporative drying type ink 2500 series, diluting solvent T-2500) was applied to one surface of the biaxially stretched film by screen printing so that the thickness of the coating layer becomes about 20 μm. Then the biaxially stretched film was dried at 80° C. for 10 minutes using a hot-air generator to obtain the decorative film.

Adhesive obtained by mixing polyether urethane resin ("DICDRY AS-106A" manufactured by DIC Corporation) and curing agent ("LR-100" manufactured by DIC Corporation) was applied onto the surface of the resin substrate composed of an ABS resin (acrylonitrile-butadiene-styrene copolymer resin). The above decorative film was positioned thereon and was bonded thereto using a hand roller.

The evaluation was conducted under the following criteria.

Good: there was no or a small degree of heat shrinkage of the biaxially stretched film in the heating and drying process after the screen printing of the acrylic coating liquid, and the decorative film was successfully bonded to the surface of the resin substrate with no positional deviation.

Poor: the heat shrinkage of the biaxially stretched film in the heating and drying process after the screen printing of the acrylic coating liquid was large and a positional deviation has occurred when the decorative film was bonded to the surface of the resin substrate.

(Retardation (Rth) in Film Thickness Direction)

A test piece having a size of 40 mm×40 mm was cut out of the biaxially stretched film. Regarding this test piece, the retardation value in a direction inclined at 400 of light having a wavelength of 590 nm was measured under conditions that the temperature was 23±2° C. and the humidity was 50±5% using an automatic birefringence meter ("KOBRA-WR" manufactured by Oji Scientific Instruments Co., Ltd.). From the resultant data, three-dimensional refractive indices nx, ny, and nz were obtained and the retardation in the thickness direction Rth=((nx+ny)/2−nz)×d was calculated.

The thickness d (nm) of the test piece was measured using a digimatic indicator (manufactured by Mitutoyo Corporation) and the refractive index n was measured using a digital high-precision refractometer ("KPR-20" manufactured by Kalnew Optical Industrial Co., Ltd.)

Example 1

The non-oriented thermoplastic resin film (F1) obtained from the above Production Example 6 was successively supplied to a tenter-type simultaneous biaxial stretching machine at a conveyance speed of 2 m/min.

In this biaxial stretching machine, the processes (I) to (V) are executed in an air circulation type drying oven.

The both of the end parts of the thermoplastic resin film (F1) in the width direction were held by the pair of tenter clamps and then preheated to 140° C. (process (I)).

Each of the tenter clamps includes a pantograph that can extract and retract and runs along one of the end parts of the film in the width direction and a plurality of clips that are provided in the pantograph and hold one of the end parts of the film.

Next, the pair of tenter clamps were operated while heating the film to 140° C. to stretch the film simultaneously in the longitudinal direction and the width direction 2.1 times (process (II)). In this process, both the stretching speed in the longitudinal direction and the stretching speed in the width direction were 1,000%/min.

Next, the film was cooled to 120° C. (process (III)).

Next, by operating the pair of tenter clamps, the film was relaxed both in the longitudinal direction and the width direction with the relaxation rate of 5% while heating the film to 120° C. in such a way that the stretching magnification in the longitudinal direction after the relaxation becomes twice and the stretching magnification in the width direction after the relaxation becomes twice (process (IV)). The relaxation speed in the longitudinal direction and the relaxation speed in the width direction were both 80%/min.

Next, the film was cooled to 70° C. and was solidified (process (V)).

At the outlet of the stretching machine, both of the end parts of the film held by the pair of tenter clamps were released while conveying the film at a conveyance speed of 4 m/min.

Next, both of the end parts of the film in the width direction where marks of the clips are left were removed by a shear cutter (process (VI), trimming process).

Last, the film was wound on a resin core in a roll shape at a winding-up tension of 90 N/m (process (VII)) to obtain the biaxially stretched film.

Then the deformation rate after the heating and the presence or the absence of wrinkles at both of the end parts of the resultant biaxially stretched film were evaluated.

Further, regarding the resultant biaxially stretched film, the decorative film was evaluated.

The main manufacturing conditions and the results of the evaluation are shown in Table 2-1.

In Table 2-1, (a) shows the temperature in the glass region, (b) shows the temperature in the glass-to-rubber transition region, and (c) shows the temperature in the rubbery plateau region (the same is applied to Tables 2-2, 3, and 4).

In Example 1, the processes (I) to (IV) were executed. The temperature in the processes (I) and (II) was set to the temperature in the rubbery plateau region and the temperature in the processes (III) and (IV) was set to the temperature in the glass-to-rubber transition region.

As shown in Table 2-1, the deformation rate of the biaxially stretched film obtained in Example 1 after the heating was 0.1%, which means that the heat shrinkage was small (good) and wrinkles were not observed at both of the end parts of the film in the width direction.

Further, according to the evaluation of the decorative film, the heat shrinkage of the biaxially stretched film in the heating and drying process after the screen printing of the acrylic coating liquid was small, and the decorative film was successfully bonded to the surface of the resin substrate with no positional deviation.

Examples 2 to 9

In Examples 2 to 9, the biaxially stretched film was manufactured in the same method as that in Example 1 except that the temperature in each process was changed as shown in Tables 2-1 and 2-2. Then the deformation rate after the heating and the presence or the absence of wrinkles at both of the end parts of the biaxially stretched film were evaluated.

The main manufacturing conditions and the results of the evaluation in each Example are shown in Tables 2-1 and 2-2.

As shown in Tables 2-1 and 2-2, the deformation rate of the biaxially stretched film obtained in Examples 2 to 8 after the heating was 0.1 to 0.4%, which means that the heat shrinkage was small (good), and wrinkles were not observed at both of the end parts of the film in the width direction.

Although the deformation rate of the biaxially stretched film obtained in Example 9 after the heating was 0.4%, which means that the heat shrinkage was small (good), wrinkles were observed at both of the end parts of the film in the width direction. However, these wrinkles do not cause any quality problem since the wrinkles can be removed in the trimming process.

Comparative Example 1

In Comparative Example 1, the biaxially stretched film was manufactured in the same method as that in Example 1 except that the temperature in the processes (I) and (II) was changed to 150° C. and the process (IV) was not executed. Then the deformation rate after the heating and the presence or the absence of wrinkles at both of the end parts of the biaxially stretched film were evaluated.

The main manufacturing conditions and the results of the evaluation are shown in Table 3.

As shown in Table 3, the deformation rate of the biaxially stretched film obtained in Comparative Example 1 after the heating was −0.1%, which means that the heat shrinkage was large (poor).

According to the evaluation of the decorative film using the resultant biaxially stretched film, the heat shrinkage of the biaxially stretched film in the heating and drying process after the screen printing of the acrylic coating liquid was large and a positional deviation has occurred when the decorative film was bonded to the surface of the resin substrate.

Comparative Examples 2 to 4

In Comparative Examples 2 to 4, the biaxially stretched film was manufactured in the same method as that in Example 1 except that the temperature in each process was changed as shown in Table 3. Then the deformation rate after the heating and the presence or the absence of wrinkles at both of the end parts of the biaxially stretched film were evaluated.

In Comparative Examples 2 and 3, regarding the resultant biaxially stretched film, the decorative film was evaluated.

The main manufacturing conditions and the results of the evaluation are shown in Table 3.

As shown in Table 3, the deformation rate of both the biaxially stretched films obtained in Comparative Examples 2 and 3 after the heating was −0.3% to −0.1%. In these examples, wrinkles were not observed in both of the end parts of the film in the width direction.

According to the evaluation of the decorative films for the biaxially stretched films obtained in Comparative Examples 2 and 3, the heat shrinkage of the biaxially stretched film in the heating and drying process after the screen printing of the acrylic coating liquid was large and a positional deviation has occurred when the decorative film was bonded to the surface of the resin substrate.

The deformation rate of the biaxially stretched film obtained in Comparative Example 4 after the heating was −0.3%, which means that the heat shrinkage was large (poor), and wrinkles were observed at both of the end parts of the film in the width direction.

Example 10

The biaxially stretched film was manufactured in the same method as that in Example 1 except that the temperature in each process was changed as shown in Table 4 using the non-oriented thermoplastic resin film (F2) obtained from the above Production Example 7. Then the deformation rate after the heating and the presence or the absence of wrinkles at both of the end parts of the biaxially stretched film were evaluated.

Further, the retardation (Rth) of the film thickness direction of the resultant biaxially stretched film was measured.

The main manufacturing conditions and the results of the evaluation are shown in Table 4.

As shown in Table 4, the deformation rate of the resultant biaxially stretched film after the heating was 0.3%, which means that the heat shrinkage was small (good), and wrinkles were not observed at both of the end parts of the film in the width direction.

The retardation (Rth) of the film thickness direction of the resultant biaxially stretched film was −1.2 nm, which was excellent as a polarizer protective film.

Example 11

The biaxially stretched film was manufactured in the same method as that in Example 1 except that the temperature in each process was changed as shown in Table 4 using the non-oriented thermoplastic resin film (F3) obtained from the above Production Example 8. Then the deformation rate after the heating and the presence or the absence of wrinkles at both of the end parts of the biaxially stretched film were evaluated.

Further, the retardation (Rth) of the film thickness direction of the resultant biaxially stretched film was measured.

The main manufacturing conditions and the results of the evaluation are shown in Table 4.

As shown in Table 4, the deformation rate of the resultant biaxially stretched film after the heating was 0.3%, which means that the heat shrinkage was small (good), and wrinkles were not observed at both of the end parts of the film in the width direction.

The retardation (Rth) of the resultant biaxially stretched film in the film thickness direction was 0.7 nm, which was excellent as a polarizer protective film.

(Summary of Results)

In Examples 1 to 11 in which the following processes:
the process (I) for preheating the thermoplastic resin film to a temperature in the rubbery plateau region in the storage elastic modulus curve (DMTA curve);
the process (II) for biaxially stretching the thermoplastic resin film under a condition that a stretching speed is 500%/min or higher while heating the thermoplastic resin film to the temperature in the rubbery plateau region;

the process (III) for cooling the thermoplastic resin film after the process (II) to a temperature in the glass-to-rubber transition region or the glass region in the storage elastic modulus curve; and the process (IV) for relaxing the thermoplastic resin film after the process (III) in a temperature in the glass-to-rubber transition region were sequentially executed, the biaxially stretched film which exhibits small heat shrinkage and has excellent dimensional stability was produced.

The quality of the decorative film that uses the biaxially stretched film obtained in Example 2 was high.

The retardation in the thickness direction of the biaxially stretched film obtained in Examples 10 and 11 was small and the resultant biaxially stretched film was suitable for the polarizer protective film.

TABLE 1-1

|  | Production Example 1 | Production Example 2 | Production Example 3 |
|---|---|---|---|
| Number of Thermoplastic Resin | X1 | X2 | X3 |
| Type of Thermoplastic Resin | PMMA | PMMA | PMMA |
| Content of Unit derived from MMA (mass %) | 100 | 100 | 100 |
| Mass Average Molecular Weight (Mw) [g/mol] | 103,600 | 81,400 | 88,600 |
| Molecular Weight Distribution | 1.81 | 1.08 | 1.32 |
| Triad Syndiotacticity (rr) [%] | 52 | 73 | 62 |
| Glass Transition Temperature Tg [° C.] | 120 | 131 | 126 |

TABLE 1-2

|  | Production Example 4 | Production Example 5 |
|---|---|---|
| Number of Thermoplastic Resin | B1 | B2 |
| Thermoplastic Resin (X3) [Pts. mass] | 95 | 93 |
| Polycarbonate Resin (Y1) [Pts. mass] | 3 | 5 |
| Processing Aid [Pts. mass] | 2 | 2 |

TABLE 1-3

|  | Production Example 1 | Production Example 2 | Production Example 3 |
|---|---|---|---|
| Number of Thermoplastic Resin | X1 | B1 | B2 |
| Type of Thermoplastic Resin | PMMA | PMMA/PC | PMMA/PC |
| Number of Unstretched Film | F1 | F2 | F3 |
| Glass Region | ~113° C. | ~122° C. | ~122° C. |
| Glass-to-Rubber Transition Region | 113° C.~138° C. | 122° C.~140° C. | 122° C.~140° C. |
| Rubbery Plateau Region | 138° C.~ | 140° C.~ | 140° C.~ |

TABLE 2-1

|  | Example 1 | Example 2 | Example 3 | Example 4 | Example 5 |
|---|---|---|---|---|---|
| Number of Thermoplastic Resin | X1 | X1 | X1 | X1 | X1 |
| Type of Thermoplastic Resin | PMMA | PMMA | PMMA | PMMA | PMMA |
| Number of Unstretched Film | F1 | F1 | F1 | F1 | F1 |
| Glass Region | ~113° C. | ~113° C. | ~113° C. | ~113° C. | ~113° C. |
| Glass-to-Rubber Transition Region | 113° C.~138° C. | 113° C.~138° C. | 113° C.~138° C. | 113° C.~138° C. | 113° C.~138° C. |
| Rubbery Plateau Region | 138° C.~ | 138° C.~ | 138° C.~ | 138° C.~ | 138° C.~ |
| Temperature in Process (I) [° C.] | 140 (c) | 150 (c) | 150 (c) | 150 (c) | 150 (c) |
| Temperature in Process (II) [° C.] | 140 (c) | 150 (c) | 150 (c) | 150 (c) | 150 (c) |
| Temperature in Process (III) [° C.] | 120 (b) | 120 (b) | 120 (b) | 130 (b) | 135 (b) |
| Temperature in Process (IV) [° C.] | 120 (b) | 120 (b) | 120 (b) | 130 (b) | 135 (b) |
| Temperature in Process (V) [° C.] | 70 (a) | 70 (a) | 70 (a) | 70 (a) | 70 (a) |
| Process (II): Stretching Magnification in Longitudinal Direction [Times] | 2.1 | 2.1 | 2.1 | 2.2 | 2.1 |
| Process (II): Stretching Magnification in Width Direction [Times] | 2.1 | 2.1 | 2.1 | 2.2 | 2.1 |
| Stretching Speed [%/min] | 1,000 | 1,000 | 1,000 | 1,000 | 1,000 |
| Relaxation Rate [%] | 5 | 5 | 5 | 10 | 5 |
| Relaxation Speed [%/min] | 80 | 80 | 80 | 80 | 80 |
| Final Stretching Magnification [Times] | 2 | 2 | 2 | 2 | 2 |
| Presence or Absence of Wrinkles in End Parts of Film [Visual Evaluation] | Absent (Good) | Absent (Good) | Absent (Good) | Absent (Good) | Absent (Good) |

TABLE 2-1-continued

|  | Example 1 | Example 2 | Example 3 | Example 4 | Example 5 |
|---|---|---|---|---|---|
| Deformation Rate (Shrinkage Rate by Heating) [%] | 0.1 | 0.4 | 0.3 | 0.2 | 0.1 |
| Evaluation of Decorative Film | Good | — | — | — | — |

TABLE 2-2

|  | Example 6 | Example 7 | Example 8 | Example 9 |
|---|---|---|---|---|
| Number of Thermoplastic Resin | X1 | X1 | X1 | X1 |
| Type of Thermoplastic Resin | PMMA | PMMA | PMMA | PMMA |
| Number of Unstretched Film | F1 | F1 | F1 | F1 |
| Glass Region | ~113° C. | ~113° C. | ~113° C. | ~113° C. |
| Glass-to-Rubber Transition Region | 113° C.~138° C. | 113° C.~138° C. | 113° C.~138° C. | 113° C.~138° C. |
| Rubbery Plateau Region | 138° C.~ | 138° C.~ | 138° C.~ | 138° C.~ |
| Temperature in Process (I) [° C.] | 160 (c) | 150 (c) | 150 (c) | 150 (c) |
| Temperature in Process (II) [° C.] | 160 (c) | 150 (c) | 150 (c) | 150 (c) |
| Temperature in Process (III) [° C.] | 120 (b) | 115 (b) | 120 (b) | 120 (b) |
| Temperature in Process (IV) [° C.] | 120 (b) | 130 (b) | 115 (b) | 120 (b) |
| Temperature in Process (V) [° C.] | 70 (a) | 70 (a) | 70 (a) | 70 (a) |
| Process (II): Stretching Magnification in Longitudinal Direction [Times] | 2.1 | 2.1 | 2.2 | 2.3 |
| Process (II): Stretching Magnification in Width Direction [Times] | 2.1 | 2.1 | 2.2 | 2.3 |
| Stretching Speed [%/min] | 1,000 | 1,000 | 1,000 | 1,000 |
| Relaxation Rate [%] | 5 | 5 | 10 | 15 |
| Relaxation Speed [%/min] | 80 | 80 | 80 | 80 |
| Final Stretching Magnification [Times] | 2 | 2 | 2 | 2 |
| Presence or Absence of Wrinkles in End Parts of Film [Visual Evaluation] | Absent (Good) | Absent (Good) | Absent (Good) | Absent (Good) |
| Deformation Rate (Shrinkage Rate by Heating) [%] | 0.4 | 0.4 | 0.4 | 0.4 |
| Evaluation of Decorative Film | — | — | — | — |

TABLE 3

|  | Comparative Example1 | Comparative Example2 | Comparative Example3 | Comparative Example4 |
|---|---|---|---|---|
| Number of Thermoplastic Resin | X1 | X1 | X1 | X1 |
| Type of Thermoplastic Resin | PMMA | PMMA | PMMA | PMMA |
| Number of Unstretched Film | F1 | F1 | F1 | F1 |
| Glass Region | ~113° C. | ~113° C. | ~113° C. | ~113° C. |
| Glass-to-Rubber Transition Region | 113° C.~138° C. | 113° C.~138° C. | 113° C.~138° C. | 113° C.~138° C. |
| Rubbery Plateau Region | 138° C.~ | 138° C.~ | 138° C.~ | 138° C.~ |
| Temperature in Process (I) [° C.] | 150 (c) | 130 (b) | 150 (c) | 150 (c) |
| Temperature in Process (II) [° C.] | 150 (c) | 130 (b) | 150 (c) | 150 (c) |
| Temperature in Process (III) [° C.] | 120 (b) | 130 (b) | 140 (c) | 105 (a) |
| Temperature in Process (IV) [° C.] | — | 130 (b) | 140 (c) | 105 (a) |
| Temperature in Process (V) [° C.] | 70 (a) | 70 (a) | 70 (a) | 70 (a) |
| Process (II): Stretching Magnification in Longitudinal Direction [Times] | 2.1 | 2.1 | 2.1 | 2.1 |
| Process (II): Stretching Magnification in Width Direction [Times] | 2.1 | 2.1 | 2.1 | 2.1 |
| Stretching Speed [%/min] | 1,000 | 1,000 | 1,000 | 1,000 |
| Relaxation Rate [%] | 0 | 5 | 5 | 5 |
| Relaxation Speed [%/min] | — | 80 | 80 | 80 |
| Final Stretching Magnification [Times] | 2 | 2 | 2 | 2 |
| Presence or Absence of Wrinkles in End Parts of Film [Visual Evaluation] | Absent (Good) | Absent (Good) | Absent (Good) | Present (Poor) |

TABLE 3-continued

|  | Comparative Example1 | Comparative Example2 | Comparative Example3 | Comparative Example4 |
|---|---|---|---|---|
| Deformation Rate (Shrinkage Rate by Heating) [%] | −0.1 | −0.3 | −0.1 | −0.3 |
| Evaluation of Decorative Film | Poor | Poor | Poor | — |

TABLE 4

|  | Example 10 | Example 11 |
|---|---|---|
| Number of Thermoplastic Resin | B1 | B2 |
| Type of Thermoplastic Resin | PMMA/PC | PMMA/PC |
| Number of Unstretched Film | F2 | F3 |
| Glass Region | ~122° C. | ~122° C. |
| Glass-to-Rubber Transition Region | 122° C.~140° C. | 122° C.~140° C. |
| Rubbery Plateau Region | 140° C.~ | 140° C.~ |
| Temperature in Process (I) [° C.] | 160 (c) | 160 (c) |
| Temperature in Process (II) [° C.] | 160 (c) | 160 (c) |
| Temperature in Process (III) [° C.] | 130 (b) | 130 (b) |
| Temperature in Process (IV) [° C.] | 135 (b) | 135 (b) |
| Temperature in Process (V) [° C.] | 70 (a) | 70 (a) |
| Process (II): Stretching Magnification in Longitudinal Direction [Times] | 2.1 | 2.1 |
| Process (II): Stretching Magnification in Width Direction [Times] | 2.1 | 2.1 |
| Stretching Speed [%/min] | 1,000 | 1,000 |
| Relaxation Rate [%] | 5 | 5 |
| Relaxation Speed [%/min] | 80 | 80 |
| Final Stretching Magnification [Times] | 2 | 2 |
| Presence or Absence of Wrinkles in End Parts of Film [Visual Evaluation] | Absent (Good) | Absent (Good) |
| Evaluation of Decorative Film | 0.3 | 0.3 |
| Retardation in Film Thickness Direction (Rth) [nm] | −1.2 | 0.7 |

This application is based upon and claims the benefit of priority from Japanese Patent Application No. 2014-72827, filed on Mar. 31, 2014, the disclosure of which is incorporated herein in its entirety by reference.

INDUSTRIAL APPLICABILITY

The biaxially stretched film according to the present invention can be applied to various films such as polarizer protective films, liquid crystal protection plates, surface materials of mobile information terminals, display window protection films of the mobile information terminals, light guide films, transparent conductive films having surfaces onto which silver nanowires or carbon nanotubes are applied, front plates of various types of displays, infrared-ray cutoff films, crime preventive films, scattering preventing films, decorative films, photovoltaic back sheets, front sheets for flexible solar cells, shrink films, films for in-mold labels and the like.

The invention claimed is:

1. A method of manufacturing a biaxially stretched film in which an unstretched thermoplastic resin film comprising at least one thermoplastic resin layer is biaxially stretched in a longitudinal direction and a width direction to manufacture the biaxially stretched film, the method comprising:
(I) preheating the thermoplastic resin film to a temperature in a rubbery plateau region in a storage elastic modulus curve;
(II) biaxially stretching the thermoplastic resin film under a condition that a stretching speed is 500%/min or higher while heating the thermoplastic resin film to the temperature in the rubbery plateau region;
(III) subsequently cooling the thermoplastic resin film to a temperature in a glass-to-rubber transition region or a glass region in the storage elastic modulus curve; and
(IV) subsequently relaxing the thermoplastic resin film at a temperature in the glass-to-rubber transition region, wherein both a relaxation speed in the longitudinal direction and a relaxation speed in the width direction in said relaxing (IV) are 80%/min or higher, and
wherein both a stretching magnification of the thermoplastic resin film in the longitudinal direction and a stretching magnification of the thermoplastic resin film in the width direction after (II) to (IV) with respect to the thermoplastic resin film before said biaxially stretching (II) are 1.5 to 3 times,
wherein the at least one thermoplastic resin layer comprises a methacryl resin in which a triad syndiotacticity (rr) is 50% or larger.

2. The method according to claim 1, wherein both a relaxation rate in the longitudinal direction and a relaxation rate in the width direction in said relaxing (IV) with respect to the thermoplastic resin film after said cooling (III) are 5 to 10.

3. The method according to claim 1, wherein the biaxially stretched film has a deformation rate (%) expressed by the following Expression (1) of 0 to 0.5%:

$$\text{Deformation rate (\%)} = \Delta L \text{ (mm)}/10 \text{ (mm)} \times 100 \quad (1)$$

wherein ΔL (mm)=L85 (mm)−L45 (mm), and
wherein the deformation rate (%) is measured by:
cutting a test piece with a length of 20 mm, a width of 5 mm, and a thickness of 45 μm out of the biaxially stretched film;
holding both end parts of the test piece in the longitudinal direction by a pair of film chucks;
setting a distance between the pair of film chucks to 10 mm;
applying a pulling load of 2 g to the biaxially stretched film;
attaching the test piece to a thermomechanical analyzer;
heating the the test piece from 25° C. to 85° C. at a heating speed of 2° C./min, holding the temperature of the test piece at 85° C. for 30 minutes, and measuring a length of the test piece at 85° C., to obtain L85 (mm); and
heating the test piece from 25° C. to 45° C. at a heating speed of 2° C./min and measuring a length of the test piece at 45° C., to obtain L45 (mm).

4. The method according to claim 1, wherein the methacryl resin has a mass average molecular weight from 80,000 to 200,000, and a content of a monomer unit derived from methyl methacrylate of 92 mass % or more.

5. The method according to claim 1, wherein the at least one thermoplastic resin layer comprises:

methacryl resin (X), which is the methacryl resin; and carbonate resin (Y) in which a melt volume flow rate measured at 300° C., with a load of 1.2 kg, for 10 minutes is 130 to 250 cm3/10 min, wherein a mass ratio of the methacryl resin (X) to the carbonate resin (Y) is 91/9 to 99/1, and wherein a total amount of the methacryl resin (X) and the carbonate resin (Y) in the at least one thermoplastic resin layer is 80 to 100 mass %.

6. The method according to claim 1, wherein the at least one thermoplastic resin layer comprises:

methacryl resin (X), which is the methacryl resin; and phenoxy resin (Z), wherein an amount of the phenoxy resin (Z) with respect to 100 parts by mass of the methacryl resin (X) is 0.1 to 8 parts by mass, and wherein a total amount of the methacryl resin (X) and the phenoxy resin (Z) in the at least one thermoplastic resin layer is 80 to 100 mass %.

7. The method according to claim 1, wherein the unstretched thermoplastic resin film is a layered film comprising a plurality of thermoplastic resin layers, and wherein the thermoplastic resin layer exposed on at least one surface comprises a thermoplastic resin in which a melt mass flow rate measured at 230° C., with a load of 3.8 kg, for 10 minutes is 10 to 15 g/10 min.

8. The method according to claim 1, wherein the unstretched thermoplastic resin film is a layered film comprising a plurality of thermoplastic resin layers, and wherein the thermoplastic resin layer exposed on at least one surface comprises fine particles.

* * * * *